(12) United States Patent
Kasper et al.

(10) Patent No.: US 12,244,173 B2
(45) Date of Patent: Mar. 4, 2025

(54) BIDIRECTIONAL BATTERY CHARGE-DISCHARGE CONTROL

(71) Applicant: Infineon Technologies Austria AG, Villach (AT)

(72) Inventors: Matthias J. Kasper, Villach (AT); Luca Peluso, Villach (AT); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 54 days.

(21) Appl. No.: 18/085,630

(22) Filed: Dec. 21, 2022

(65) Prior Publication Data

US 2023/0124533 A1 Apr. 20, 2023

Related U.S. Application Data

(62) Division of application No. 17/112,577, filed on Dec. 4, 2020, now Pat. No. 11,569,681.

(51) Int. Cl.
*H02J 9/00* (2006.01)
*H02J 7/04* (2006.01)
*H02J 9/06* (2006.01)
*H02M 3/335* (2006.01)

(52) U.S. Cl.
CPC ................ *H02J 9/062* (2013.01); *H02J 7/04* (2013.01); *H02M 3/33584* (2013.01); *H02J 2207/20* (2020.01)

(58) Field of Classification Search
CPC ...................................................... H02J 9/062
See application file for complete search history.

(56) References Cited

U.S. PATENT DOCUMENTS

| | | | | |
|---|---|---|---|---|
| 6,909,201 B2* | 6/2005 | Murty | .................. | H02J 7/1423 307/10.6 |
| 8,097,975 B2* | 1/2012 | Bosch | ................. | F02N 11/0866 307/9.1 |
| 10,272,788 B2* | 4/2019 | Huh | ........................ | B60L 50/60 |
| 2002/0067630 A1* | 6/2002 | Tokunaga | ........... | H02M 1/4208 363/125 |
| 2010/0231178 A1 | 9/2010 | Handa et al. | | |

(Continued)

FOREIGN PATENT DOCUMENTS

| | | |
|---|---|---|
| EP | 3771069 A1 | 1/2021 |
| WO | 2014142685 A1 | 9/2014 |
| WO | 2019180784 A1 | 9/2019 |

OTHER PUBLICATIONS

Extended Search Report, EP 21208941, May 10, 2022, pp. 1-13.

*Primary Examiner* — Adi Amrany
(74) *Attorney, Agent, or Firm* — Armis IP Law, LLC

(57) ABSTRACT

This disclosure includes novel ways of implementing a power supply that powers a load. More specifically, a power supply includes a bidirectional power converter and a controller. The controller monitors a magnitude of an input voltage supplied from an input voltage source to a load. Based on a magnitude of the input voltage, the controller switches between a first mode of operating the bidirectional power converter to charge an energy storage resource using (a portion of power provided by) the input voltage and a second mode of producing a backup voltage from the energy storage resource to power the load as a substitute to the input voltage such as when the input voltage is below a threshold value.

13 Claims, 14 Drawing Sheets

(56) References Cited

U.S. PATENT DOCUMENTS

| | | |
|---|---|---|
| 2013/0057200 A1 | 3/2013 | Potts et al. |
| 2015/0349647 A1 | 12/2015 | Zane et al. |
| 2016/0241082 A1 | 8/2016 | Stoevring |
| 2018/0212460 A1* | 7/2018 | Shibata .................. H02J 9/062 |
| 2019/0334376 A1* | 10/2019 | Toyoda .................. H02P 27/06 |
| 2020/0369168 A1 | 11/2020 | Barker et al. |
| 2023/0187958 A1* | 6/2023 | Peluso ..................... H02J 7/36 |
| | | 307/49 |

\* cited by examiner

BIDIRECTIONAL BATTERY CHARGE-DISCHARGE CONTROL

RELATED APPLICATION

This application is a divisional application of earlier filed U.S. patent application Ser. No. 17/112,577 entitled "BIDIRECTIONAL BATTERY CHARGE-DISCHARGE CONTROL,", filed on Dec. 4, 2020, the entire teachings of which are incorporated herein by this reference.

BACKGROUND

A conventional backup power system typically includes a battery to store energy to power a load during outages. For example, a load is typically powered via a main input voltage during normal operating conditions. When a power outage occurs, the main input voltage is no longer available. In such an instance, the backup power system supplies power the load via converting energy stored in the battery into a backup voltage supplied to the load.

Conventional power converter topologies include the well-known buck, boost, 4-switch buck-boost converters, etc. When implementing these topologies, the corresponding semiconductor devices must be rated according to the total output voltage (for boost converters) or total input voltage (for buck converters). This mandates employment of devices with a non-optimal FOM. Moreover, despite a narrow conversion range of voltage provided by a battery, and because of the high power consumption level of a load (3 kW in the considered case), the conventional converter experiences high currents impacting not only the efficiency of the power converter but also the cost and power density as both passive and active components need to be chosen according to such high currents.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

Embodiments herein include novel ways of implementing a battery backup power supply that powers a load.

A power supply includes a bidirectional power converter and a controller. The controller monitors a magnitude of an input voltage supplied from an input voltage source to power a load. Based on a magnitude of the input voltage, the controller switches between a first mode of operating the bidirectional power converter to charge an energy storage resource using (a portion of power provided by) the input voltage and a second mode of producing a backup voltage from the energy storage resource to power the load as a substitute to the input voltage such as when the input voltage is below a threshold value.

In one embodiment, the controller switches from operating the bidirectional power converter in the first mode to operating the bidirectional power converter in the second mode in response to detecting that the input voltage falls below a threshold value (such as voltage needed to power a load).

Further embodiments herein include, via the bidirectional power converter, producing the backup voltage as a combination of a first voltage supplied by the energy storage resource and an isolated auxiliary voltage (such as ground-isolated auxiliary voltage) derived from the first voltage.

In one non-limiting example embodiment, the energy storage resource is or includes one or more batteries; the backup voltage generated by the bidirectional power converter is a summation of the first voltage and the auxiliary voltage.

In still further example embodiments, in furtherance of producing the backup voltage, the controller produces an auxiliary voltage from a supply voltage outputted from the energy storage resource. In such an instance, during the second mode, the bidirectional power converter offsets the auxiliary voltage by the supply voltage to produce the backup voltage.

The bidirectional power converter controls a flow of power (energy) between the energy storage resource and the load. For example, in one embodiment, a magnitude of power conveyed from the input voltage through the bidirectional power converter to charge the energy storage resource while in the first mode is less than a magnitude of power supplied by the energy storage resource through the bidirectional power converter to produce the back-up voltage outputted to power the load.

In yet further example embodiments, in the first mode, the controller controls a first magnitude of power flow in a first direction from the energy storage resource through the bidirectional power converter to produce the backup voltage; in the second mode, the controller controls a second magnitude of power flow in a second direction from the input voltage through the bidirectional power converter to the energy storage resource. In one embodiment, the second magnitude of power flow is less than the first magnitude of power flow.

The bidirectional power converter can be configured to include any number of power stages and/or power converters. For example, in one embodiment, the bidirectional power converter includes an unregulated power converter stage and a regulated power converter stage. Via the unregulated power converter stage, the bidirectional power converter produces an intermediate voltage from a supply voltage outputted from the energy storage resource (such as a battery system or other suitable resource). Via the regulated power converter stage, the bidirectional power converter converts the intermediate voltage into an auxiliary voltage. In still further example embodiments, the controller controllably switches a polarity of the auxiliary voltage to generate the backup voltage.

Further embodiments herein include, via the bidirectional power converter, producing the auxiliary voltage as a floating voltage and offsetting the intermediate voltage with respect to the supply voltage outputted from the energy storage resource to produce the backup voltage. In one embodiment, an efficiency of producing the backup voltage via the bidirectional power converter increases over time subsequent to initial activation of the bidirectional power converter in the second mode. More specifically, in one embodiment, the efficiency increases until the difference VBAT-Vbackup reaches its minimum (because the processed power decreases), but when such difference increases again (which happens in the case where Vload falls within the VBAT range), the efficiency starts decreasing again. This is further shown in drawings and corresponding text of this disclosure.

Still further non-limiting example embodiments herein include, outputting a supply voltage from the energy storage resource to the bidirectional power converter. A magnitude of the supply voltage varies in a particular voltage range; a magnitude of the produced backup voltage falls within the particular voltage range during operation of the bidirectional power converter in the second mode. In accordance with further example embodiments, note that the back-up voltage (VBAT+VAUX) as described herein doesn't fall necessarily within the VBAT voltage range.

In accordance with further example embodiments, at least one stage of the bidirectional power converter is regulated. In one embodiment, the first stage such as a DCX phase circuitry stage is unregulated and a second power converter stage such as a buck converter is regulated. In one embodiment, the first stage such as a DCX phase circuitry stage is regulated (LLC circuit) and the second power converter stage such as a buck phase circuitry is unregulated. Additionally, or alternatively, as described herein, both the first power converter stage and the second phase circuitry stage are regulated or semi-regulated.

In further example embodiments, the bidirectional power converter includes a first power converter stage and a second power converter stage. In one embodiment, the first power converter stage is a regulated power converter stage; the power converter stage is a regulated power converter stage.

In still further example embodiments, the bidirectional power converter includes a first power converter stage and a second power converter stage. In one embodiment, the first power converter stage being a semi-regulated power converter stage. The second power converter stage is a semi-regulated power converter stage.

In accordance with further example embodiments, the bidirectional power converter is a single power converter stage operative to provide ground isolation between the input voltage and the energy storage resource. If desired, the single power converter stage is operative to provide voltage regulation.

In still further example embodiments, the bidirectional power converter includes a galvanic isolated power converter operative to convert a supply voltage received from the energy storage resource into an auxiliary voltage (such as a ground-isolated auxiliary voltage). The bidirectional power converter produces the backup voltage using the auxiliary voltage. In one embodiment, the backup voltage is generated via offsetting the auxiliary voltage by the supply voltage of the energy storage resource.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor a magnitude of an input voltage supplied to a load from an input voltage source; and based on a magnitude of the input voltage, switch between: i) a first mode of operating a bidirectional power converter to charge an energy storage resource using the input voltage, and ii) a second mode of producing a backup voltage from the energy storage resource to power the load.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
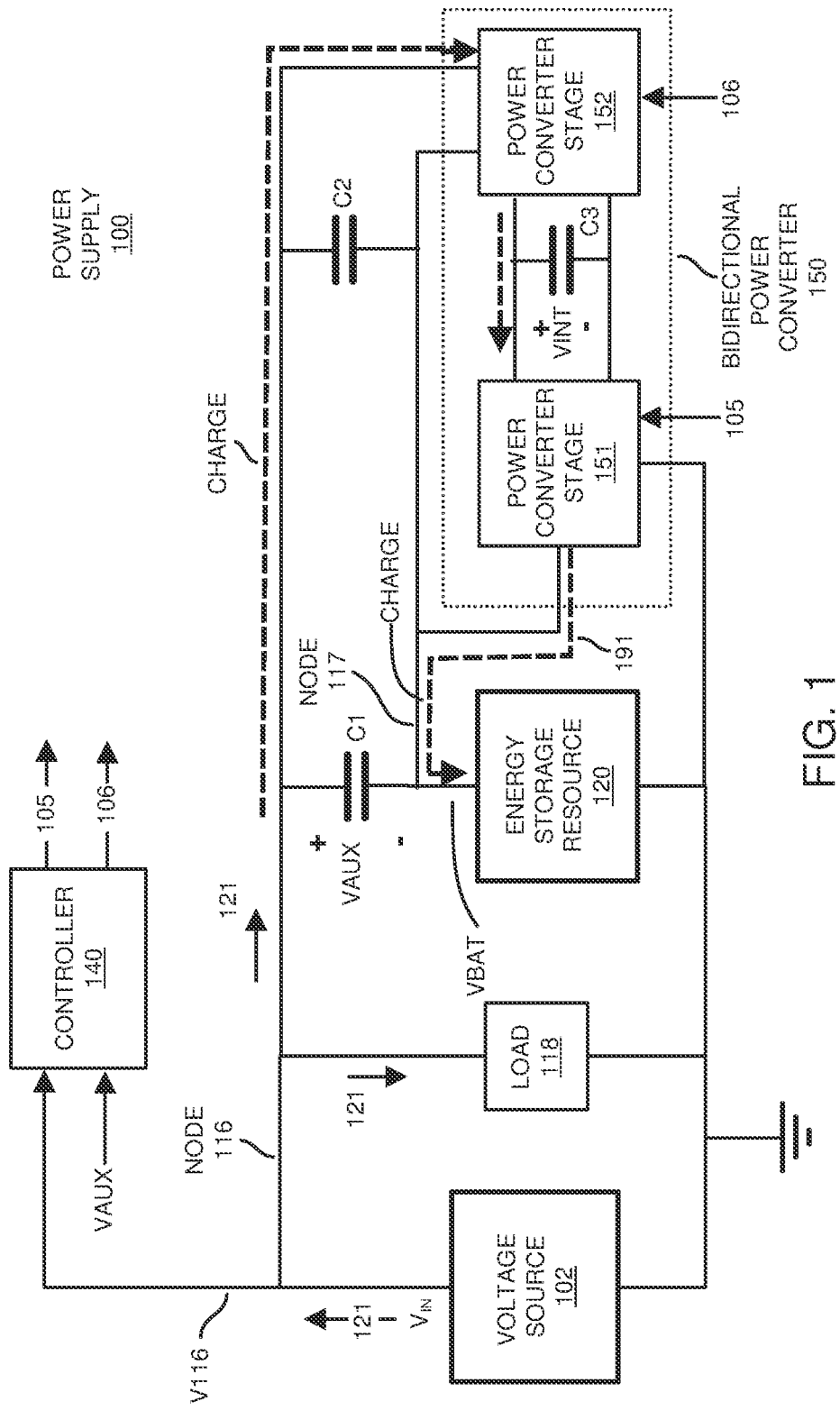
FIG. 1 is an example general diagram of a power supply including a bidirectional power converter operating in a first mode (such as battery charge mode) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include novel ways of implementing a power supply that powers a load. More specifically, embodiments herein include an apparatus and/or system including a controller and a bidirectional power converter. The controller monitors a magnitude of an input voltage supplied from an input voltage source to a load. Based on a magnitude of the input voltage, the controller switches between a first mode of operating the bidirectional power converter to charge an energy storage resource using (a portion of power provided by) the input voltage and a second mode of producing a backup voltage from the energy storage resource to power the load as a substitute to the input voltage such as when the input voltage is below a threshold value.

Now, more specifically, FIG. 1 is an example general diagram of a power system (power supply) including multiple power converters operating in a first mode according to embodiments herein.

In this example embodiment, the power supply 100 includes controller 140, voltage source 102, energy storage resource 120 (such as battery assembly, battery backup system, or other suitable entity), and bidirectional power converter 150. The bidirectional power converter 150 includes multiple power converter stages such as power converter stage 151 and power converter stage 152.

In one embodiment, note that the bidirectional power converter 150 and corresponding power converter stage 151, capacitor C3, and power converter stage 152 is considered to be a single power converter stage providing one or more functions such as voltage regulation, ground isolation capabilities (e.g. LLC), etc., as described herein.

As further shown, the power supply 100 includes multiple capacitors such as capacitor C1, capacitor C2, capacitor C3, etc., to store voltage/charge.

The controller 140 operates the bidirectional power converter 150 in multiple different modes depending upon a status of the voltage source 102.

For example, the controller 140 monitors a magnitude of the voltage V116 at node 116 supplied from the input voltage source 102 to the load 118. Based on a magnitude of the input voltage 121 (voltage V116 at node 116) supplied to node 116, the controller 121 switches between: i) a first mode of operating the bidirectional power converter 150 to charge the energy storage resource 120 using (a portion of power provided by) the input voltage 121, and ii) a second mode of producing a backup voltage 221 (see FIG. 2) from the energy storage resource 120 to power the load 118 as a substitute to the input voltage 121 such as when the input voltage 121 is below a threshold value.

Assume in this example embodiment of FIG. 1 that the magnitude of the input voltage 121 supplied by the voltage source 102 is above a threshold value and that the controller detects that the energy storage resource 120 needs to be charged. In one embodiment, the controller monitors a status of the battery voltage or other suitable parameter to determine a state of charge associated with the energy storage resource 120 and whether the energy storage resource 120 needs to be charged or not using power from the input voltage 121.

During conditions in which the energy storage resource 120 needs to be charged, the controller 140 produces the respective control signals 105 and 106 to operate the bidirectional power converter 150 in a charge mode in which the input voltage 121 is conveyed to the power converter stage 152. Based on the input voltage 121, via controller 140, the power converter stage 152 produces intermediate voltage VINT stored on capacitor C3. Power converter stage 151 receives the intermediate voltage VINT and converts the intermediate voltage VINT into charge voltage 191 applied to the energy storage resource 120.

Thus, in one embodiment, the bidirectional power converter 150 controls a flow of power (energy) between the input voltage source 102 and the energy storage resource 120.

In one embodiment, a magnitude of power conveyed from the input voltage 121 through the bidirectional power converter 150 to charge the energy storage resource 120 while in the first mode (FIG. 1) is less than a magnitude of power supplied by the energy storage resource through the bidirectional power converter 150 to produce the back-up voltage 221 outputted to the load 118 during a second condition (FIG. 2) in which the controller 140 controls the bidirectional power converter 150 to discharge the energy storage resource 120.

Figure 2:
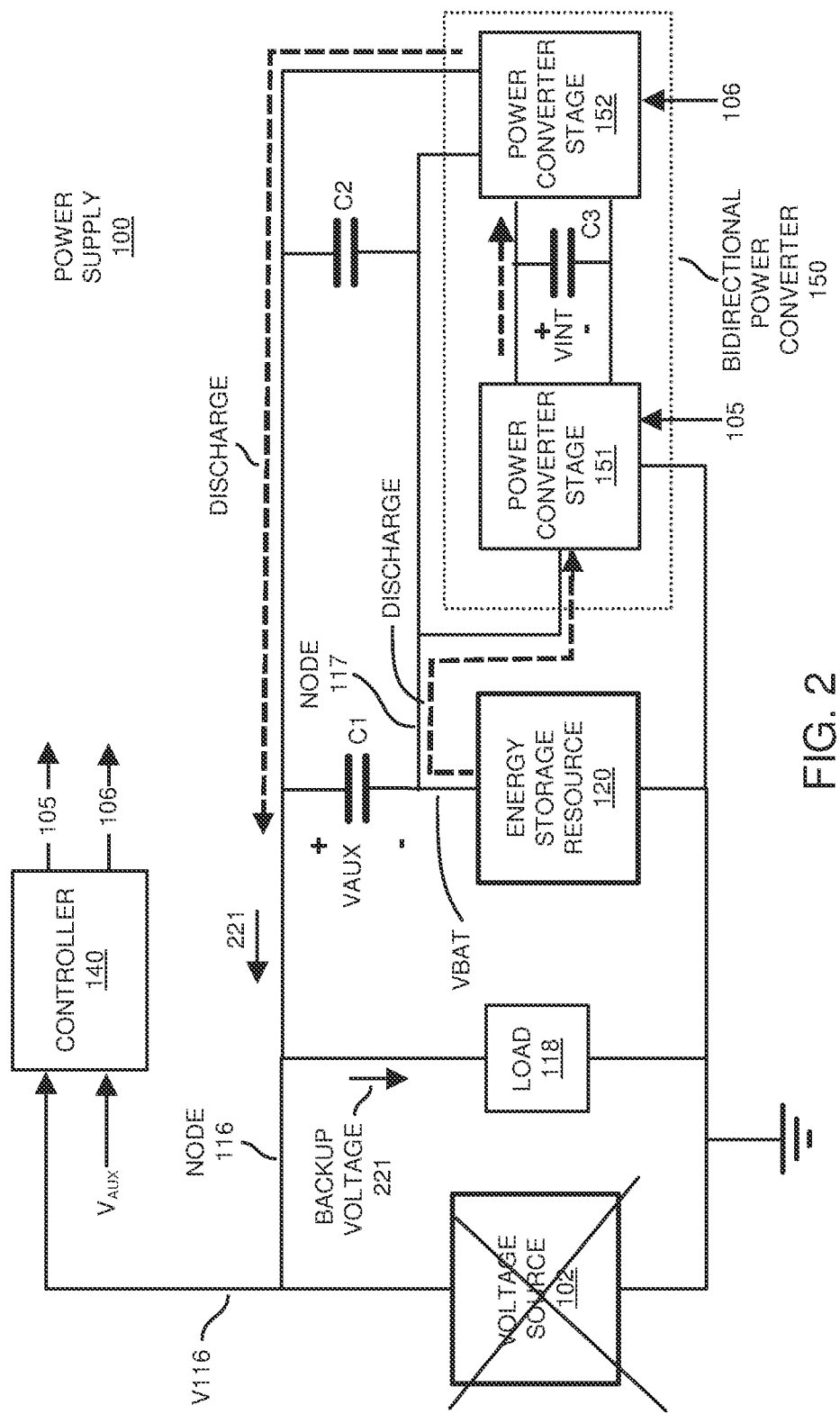
FIG. 2 is an example general diagram of a power supply including a bidirectional power converter operating in a second mode (such as battery discharge mode) according to embodiments herein.

FIG. 2 is an example general diagram of a power supply including a bidirectional power converter operating in a second mode (battery discharge mode) according to embodiments herein.

As previously discussed, the power supply 100 includes controller 140, voltage source 102, energy storage resource 120 (such as battery assembly, battery backup system, or other suitable storage entity), and bidirectional power converter 150. The bidirectional power converter 150 includes multiple power converter stages such as power converter stage 151 and power converter stage 152. The multiple capacitors such as capacitor C1, capacitor C2, capacitor C3, etc., to store voltage/charge.

In this example embodiment, the voltage source 102 experiences a condition in which the magnitude of the input voltage 121 drops below a respective threshold value. In response to detecting such a condition, the controller 140 produces the control signals 105 and 106 to operate the bidirectional power converter 150 in a second mode of producing backup voltage 221 from the energy storage resource 120 to power the load 118.

In one embodiment, the backup voltage VBAT is a substitute for powering the load 118 such as when the input voltage 121 is below a threshold value. Switchover of the bidirectional power converter 150 to the second mode (discharge mode) ensures that the load 118 is continuously or near continuously powered with a respective voltage without interruption or with a short interruption when the voltage source 102 fails to produce the input voltage 121 above a threshold value.

Further embodiments herein include, via the bidirectional power converter 150, while in mode #2, producing the backup voltage 221 as a combination (such as summation) of the supply voltage VBAT (first voltage) supplied by the energy storage resource 120 and a ground-isolated auxiliary voltage VAUX derived from the supply voltage VBAT via the bidirectional power converter 150.

More specifically, in furtherance of producing the backup voltage 221 to power the load 118 when the input voltage 121 is not present or is below a threshold value, the controller 140 controls operation of the bidirectional power converter 150 to produce an auxiliary voltage VAUX from the VBAT supply voltage outputted from the energy storage resource 120.

In one embodiment, as depicted in FIG. 2, during the second mode, the bidirectional power converter 150 offsets the auxiliary voltage VAUX by the supply voltage VBAT to produce the backup voltage 221.

Thus, in the first mode implemented in FIG. 1, the controller 140 controls a first magnitude of power flow in a first direction (such as clockwise) from the input voltage 121 through the bidirectional power converter 150 to the energy storage resource 120. In the second mode implemented in FIG. 2, the controller 140 controls a second magnitude of power flow in a second direction (such as counter-clockwise) from the energy storage resource 120 through the bidirectional power converter 150 to produce the backup voltage 221.

As previously discussed, the bidirectional power converter 150 can be configured to include any number of power stages and/or power converters. For example, in one embodiment, the bidirectional power converter 150 includes power converter stage 151 such as an unregulated power converter stage and power converter stage 152 such as a regulated power converter stage.

Via the first power converter stage 151, the bidirectional power converter produces an intermediate voltage VINT (such as a DC voltage) from a supply voltage VBAT outputted from the energy storage resource 120 (such as a battery or other suitable resource). The power converter stage 151 outputs the intermediate voltage VINT to the capacitor C3.

The power converter stage 152 receives the intermediate voltage VINT stored in the capacitor C3. Via the power converter stage 152 (such as regulated power converter stage), the bidirectional power converter 150 converts the intermediate voltage VINT into a ground-isolated auxiliary voltage VAUX.

In one embodiment, as previously discussed, the isolated auxiliary voltage VAUX is offset or referenced with respect to the voltage VBAT associated with the energy storage resource 120 to produce the backup voltage 221. In such an instance, the backup voltage 221 is a summation of the voltage VBAT supplied by the energy storage resource 120 and the auxiliary voltage VAUX.

As previously discussed, the controller monitors a magnitude of the voltage V116 at node 116. In one embodiment, when the input voltage 102 falls below a threshold value such as 48 VDC, the controller 140 controls a magnitude of the auxiliary voltage VAUX produced by the power converter stage 152 such that the magnitude of the backup voltage 221 is equal a target backup voltage value such as 48 VDC (or other suitable value) to power the load 118.

Note that the voltage VBAT supplied by the energy storage resource 120 is susceptible to varying over time during the second operational mode. In one embodiment, via operation of the power converter stage 152 and generation of corresponding control signals 106 to drive the power converter stage 152, the controller 140 varies a magnitude of the auxiliary voltage VAUX such that the sum of the voltage VBAT and the auxiliary voltage VAUX is equal to a setpoint voltage of the target backup voltage 48 VDC.

Thus, in one embodiment, such as previously discussed with respect to FIG. 1, the voltage source 102 powers the load 118 when the input voltage 121 is around 50 VDC. When the input voltage 121 falls below a threshold value such as 48 VDC as shown in FIG. 2, the controller 140 controls operation of the bidirectional power converter 150 in a manner as previously discussed to produce the backup voltage 221 to be around a target value of 48 VDC. Powering the load 118 with the backup voltage 221 as a backup to the input voltage 121 ensures that the load 118 is powered when voltage source 102 is unable to power the load 118 via the input voltage 121.

In still further example embodiments, as further discussed herein, note that the controller 140 can be configured to controllably switch a polarity of the isolated auxiliary voltage VAUX to generate the backup voltage. For example, the magnitude of the voltage VBAT may be greater than or less than the target backup voltage of 48 VDC. As further discussed herein, if the voltage VBAT is less than backup target voltage 48 VDC, the controller 140 produces the regulated auxiliary voltage VAUX to be a positive value; if the voltage VBAT is greater than target backup 48 VDC, the controller 140 produces the regulated auxiliary voltage VAUX to be a negative value.

In yet further example embodiments, the magnitude of the voltage VBAT can be greater than or less than the target voltage such as 48 VDC. Thus, in one embodiment, a magnitude of the supply voltage VBAT varies in a voltage range such as between 40 and 56 VDC. In such an embodiment, a magnitude of the produced backup voltage 221 falls within the voltage range 40 VDC to 56 VDC during operation of the bidirectional power converter 150 in the second mode.

Figure 3:
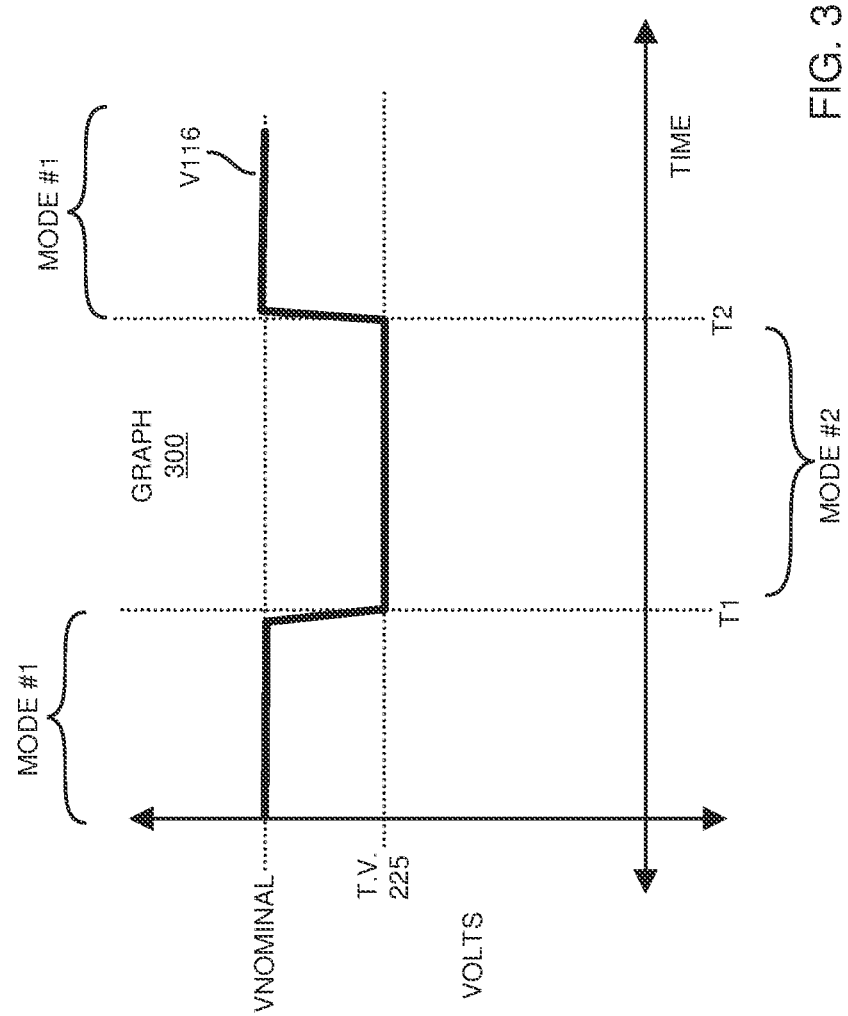
FIG. 3 is an example graph illustrating operation of bidirectional power converter in different modes depending on a magnitude of an input voltage according to embodiments herein.

FIG. 3 is an example graph illustrating operation of bidirectional power converter in different modes depending on a magnitude of an input voltage according to embodiments herein.

In one embodiment, power supply 100 supplies an input voltage 121 (such as around 50 VDC) during normal operating conditions when the voltage source 102 is healthy. In such an embodiment, assume that the input voltage 121 is equal to VNOMINAL=50 VDC. The power supply 100 supports lower conversion and distribution losses, keeping a safe voltage for human contact during maintenance and reducing the possibility of employing back up batteries during power outages. The proposed power supply 100 aims specifically to this last point.

For example, as depicted in FIG. 2, the energy storage resource 120 (such as back-up battery system of one or more batteries) is used to produce the backup voltage 221 supplied to the load 118 when the input voltage 121 falls below a threshold value 225 such as around 48 VDC (or other suitable value).

Referring again to FIG. 3, graph 300 illustrates operation of the bidirectional power converter 150 in the first operational mode of charging, if needed, the energy storage resource 120 based on the input voltage 121 supplied by the voltage source 102. Between time T1 and time T2, the controller 140 detects that the magnitude of the input voltage 121 falls below the threshold value 225. To provide backup power, the controller 140 operates the bidirectional power converter 150 to produce the backup voltage 221.

Note again that the power converter stage 151 (such as a one or more DC/DC power converter stages) provides bidirectionality, since in addition to supplying power to produce the backup voltage 221 (such as regulated voltage VAUX plus VBAT) when the voltage source 102 (such as a main AC/DC converter) fails, the bidirectional power converter 150 also has to charge the energy storage resource 120 during normal operational mode when the voltage source 102 supplies a proper magnitude of voltage (via input voltage 121) to the load 118.

Note further that the implementation of the bidirectional power converter 150 (such as including a back-up battery DC/DC stage) depends on the input voltage 121, which corresponds to the battery voltage range (associated with VBAT) that is defined by the maximum and minimum battery voltages during the charging phase (mode #1) and discharging phase (mode #2). Such voltage range depends on the specific configuration of the energy storage resource 120 (such as battery pack or other suitable entity). There are several energy storage resource configurations, but in general they can be classified in 3 different sets according to their voltage ranges in relation to the target bus voltage (i.e., 48 VDC).

For example, in one embodiment, the first configuration of the energy storage resource 120 includes a configuration in which a voltage range associated with voltage VBAT supplied by the energy storage resource 120 is always higher than the target delivery voltage of 48 VDC. In such an instance, the stages 151 and 152 associated with the bidirectional power converter 150 needs to provide step-down capabilities from the voltage VBAT to produce the target backup voltage 221 (such as 48 VDC) to the load 118.

The second configuration of the energy storage resource 120 is one in which the battery voltage VBAT varies in a range between being higher and lower than a magnitude of the backup voltage 221 such as a target voltage of 48 VDC. In this case, the bidirectional power converter 150 provides both step-up and step-down capabilities (to produce the backup voltage 221) depending on a magnitude of the voltage VBAT over time. Typically, when fully charged, a magnitude of the voltage VBAT associated with the energy storage resource 120 starts at a high magnitude and reduces over time during discharge of the energy storage resource 120.

Finally, the third configuration of the energy storage resource 120 is one in which the range of voltages supplied by voltage VBAT are always less than the target voltage of 48 VDC. In this case, the bidirectional power converter 150 (such as DC/DC converter) provides step-up capabilities to produce the backup voltage 221.

Thus, the energy storage resource 120 can be configured in any suitable manner to provide different magnitudes of VBAT voltages. For example, in a first embodiment (such as implementing a 20S4P battery configuration, 20 series×4 parallel batteries), the range of voltage VBAT provided by the energy storage resource 120 is always greater than the target magnitude of the backup voltage 221 (such as 48 VDC); in a second embodiment (such as implementing a 14S6P battery configuration, 14 series×6 parallel batteries), the range of VBAT voltage provided by the energy storage resource 120 can be higher or lower than the target magnitude of the backup voltage 221 (such as 48 VDC) depending on a state of charging the energy storage resource 120; in a third embodiment (such as implementing a 10S8P battery configuration, 10 series×8 parallel batteries), the range of VBAT voltage provided by the energy storage resource 120 is always less than the magnitude of the backup voltage 221 (such as 48 VDC).

Based on the concept of "Partial-Power-Conversion" as described herein, the bidirectional power converter 150 introduces novel power converter topology implementations for each of multiple different battery pack configurations. The bidirectional power converter 150 as described herein provides: i) outstanding efficiency, ii) enables use of semiconductor devices with a better FOM, iii) offers a fast load response due to the buck-like dynamic operation in all load cases, etc.

Figure 4:
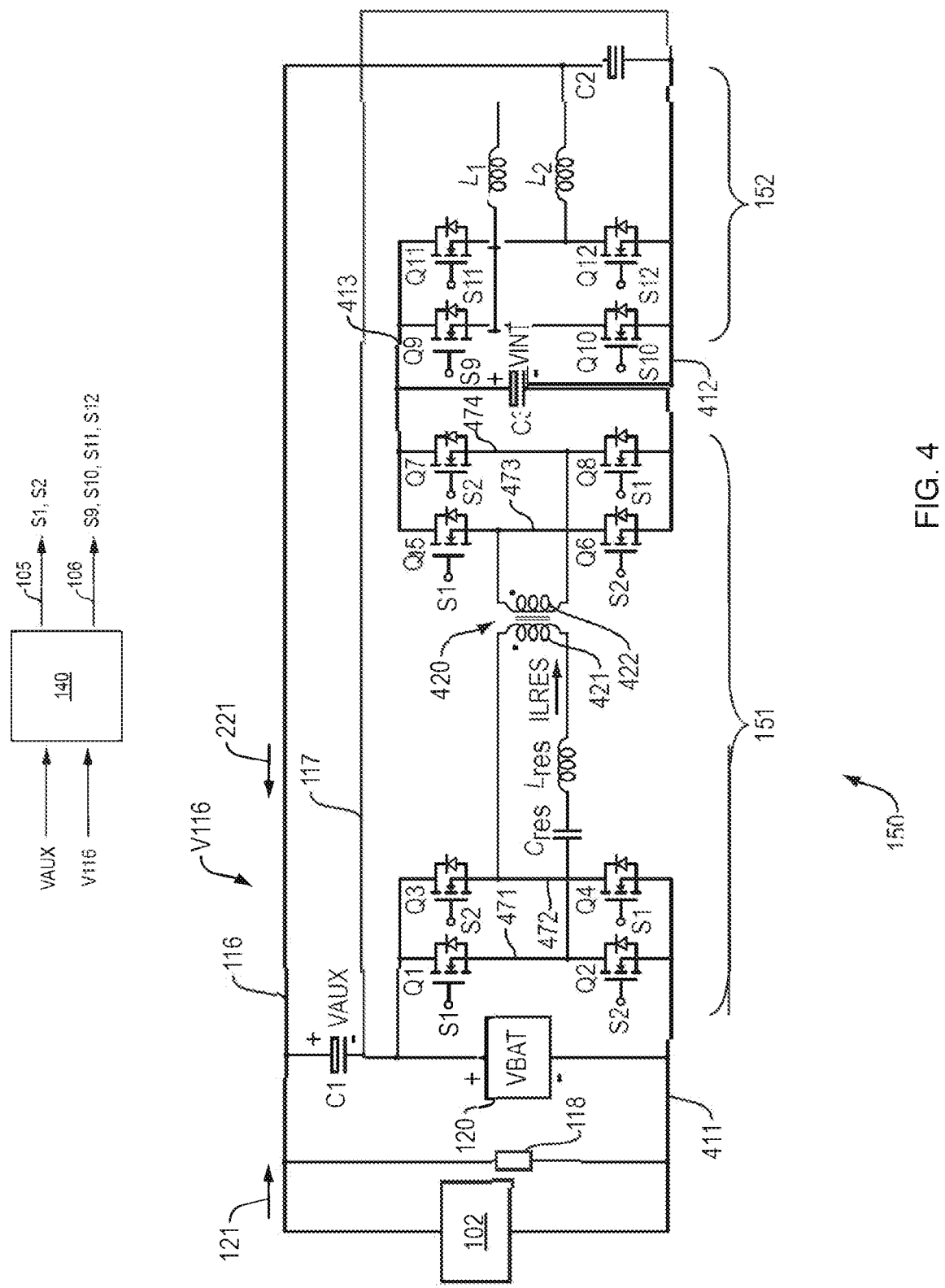
FIG. 4 is an example diagram illustrating a power supply circuit including a bidirectional power converter according to embodiments herein.

FIG. 4 is an example diagram illustrating a power supply circuit including a bidirectional power converter according to embodiments herein.

In this embodiment, the power converter stage 151 of the bidirectional power converter 150 includes switches Q1, Q2, Q3, Q4, Q5, Q6, Q7, and Q8. Additionally, the power converter stage 151 includes capacitor Cres, inductor Lres, and transformer 420. Transformer 420 includes primary winding 421 magnetically coupled to secondary winding 422.

As further shown, switch Q1 and switch Q2 are connected in series between the node 117 and node 411. More specifically, the drain node of switch Q1 is connected to the node 117; the source node of switch Q1 is connected to the drain node of switch Q2 at node 471; the source node of switch Q2 is connected to the ground reference node 411.

Switch Q3 and switch Q4 are connected in series between the node 117 and node 411. More specifically, the drain node of switch Q3 is connected to the node 117; the source node of switch Q3 is connected to the drain node of switch Q4 at node 472; the source node of switch Q4 is connected to the ground reference node 411.

The combination of capacitor Cres, inductor Lres, and the primary winding 421 are connected in series between node 471 and node 472.

As further shown, switch Q5 and switch Q6 are connected in series between the node 413 and node 412. More specifically, the drain node of switch Q5 is connected to the node 413; the source node of switch Q5 is connected to the drain node of switch Q6 at node 473; the source node of switch Q6 is connected to the isolated ground reference node 412.

The secondary winding 422 is connected between node 473 and node 474.

Capacitor C3 (storing intermediate voltage VINT) is connected between node 413 and node 412.

As previously discussed, the controller produces signals S1 and S2. Control signal S1 is inputted to the gates of switches Q1, Q4, Q5, and Q8. Control signal S2 is inputted to the gates of switches Q2, Q3, Q6, and Q7.

Figure 6:
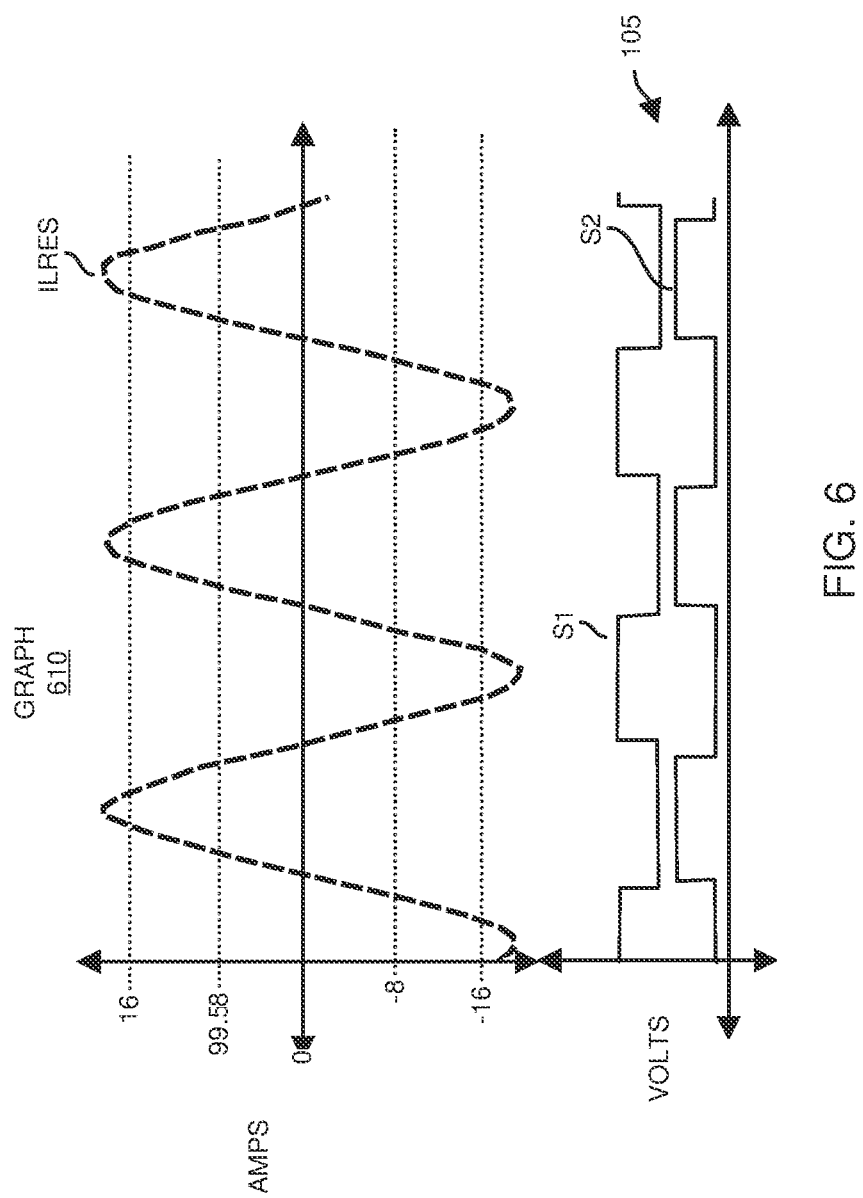
FIG. 6 is an example timing diagram illustrating operation of a first power converter stage in a bidirectional power converter according to embodiments herein.

Switching operation of the power converter stage 151 and conversion of the supply voltage VBAT into the intermediate voltage VINT during generation of the backup voltage 221 is further shown in FIG. 6.

Referring again to FIG. 4, as further shown in this embodiment, the power converter stage 152 of the bidirectional power converter 150 includes switches Q9, Q10, Q11, and Q12. Additionally, the power converter stage 152 includes inductor L1 and inductor L2.

As further shown, switch Q9 and switch Q10 are connected in series between the node 413 and node 412. More specifically, the drain node of switch Q9 is connected to the node 413; the source node of switch Q9 is connected to the drain node of switch Q10 at node 481; the source node of switch Q10 is connected to the node 412.

Switch Q11 and switch Q12 are connected in series between the node 413 and node 412. More specifically, the drain node of switch Q11 is connected to the node 413; the source node of switch Q11 is connected to the drain node of switch Q12 at node 482; the source node of switch Q12 is connected to the node 412.

As previously discussed, the controller 140 produces signals 106 such as signals S9, S10, S11, and S12. Control signal S9 is inputted to the gate of switch Q9 (such as high side switch circuitry); control signal S10 is inputted to the gate of switch Q10 (such as low side switch circuitry); control signal S11 is inputted to the gate of switch Q11 (such as high side switch circuitry); control signal S12 is inputted to the gate of switch Q12 (such as low side switch circuitry).

Inductor L1 is connected between node 481 and node 116; inductor L2 is connected between node 482 and node 116. Thus, power converter stage 152 includes multiple buck converters in parallel. The power converter stage 152 can include any number of buck converter phases.

Figure 7:
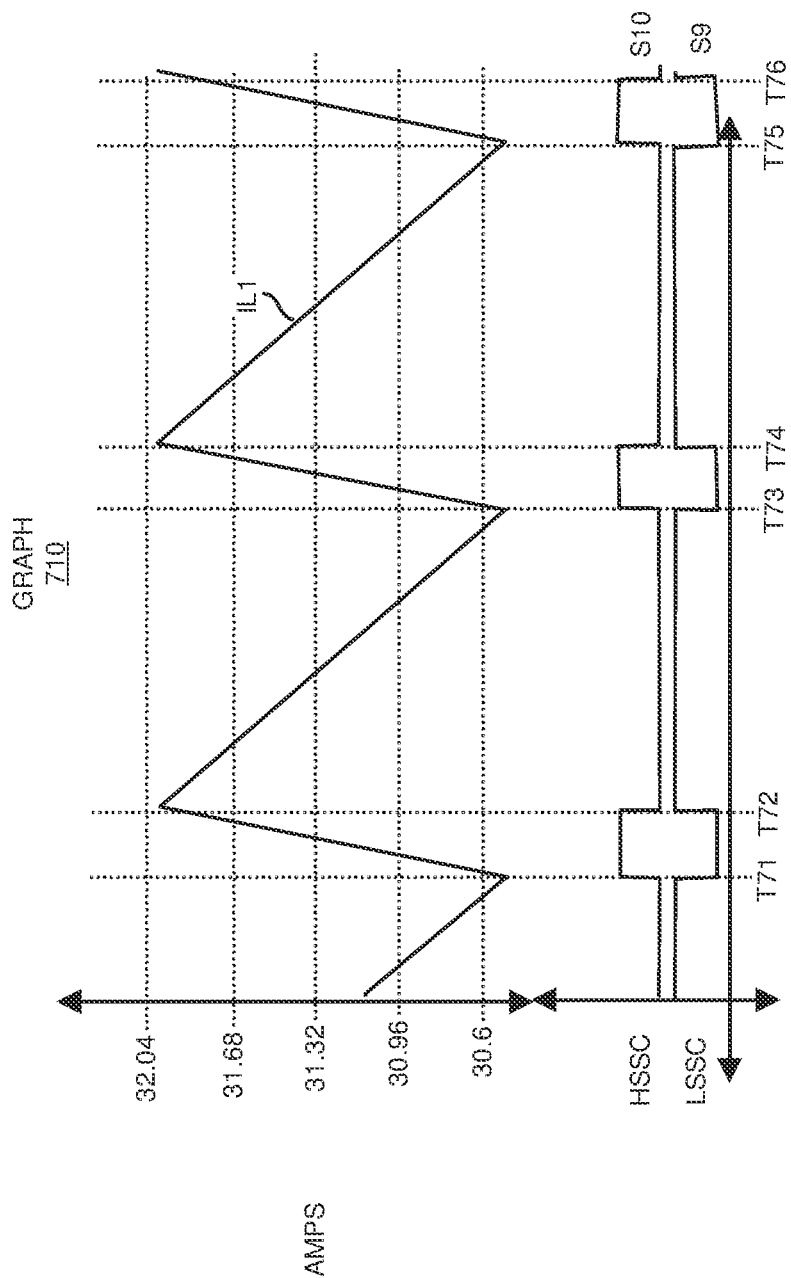
FIG. 7 is an example timing diagram illustrating operation of a second power converter stage in a bidirectional power converter according to embodiments herein.

Switching operation of the power converter stage 152 and conversion of the intermediate voltage VINT into the auxiliary voltage VAUX during generation of the backup voltage 221 is further shown in FIG. 7.

Referring again to FIG. 4, this implementation of the bidirectional power converter 150 and corresponding power supply 100 provides one or more of the following features:

Ultra-high efficiency due to partial power conversion
Lower voltage ratings of the semiconductor devices compared to SotA solutions
Soft-switching capability
Bidirectionality capabilities
Galvanic Isolation
Buck-like dynamic without right half plane zero for fastest response during the battery discharging phase i.e. while suppling the 48V dc-bus.
Suitability for all battery pack configurations In one embodiment, the magnitude of the supply voltage VBAT from the energy storage resource 120 varies between 25 VDC and 41 VDC, depending on a state of charge. While in mode #2, the controller 140 controls a state of the switches Q1-Q12 in the bidirectional power converter 150 such that the magnitude of the backup voltage 221 is equal to the target backup voltage 48 VDC. In such an instance, the bidirectional power converter 150 produces the auxiliary voltage VAUX such that the backup voltage 221 is equal to the target voltage value 48 VDC.

As previously discussed, the bidirectional power converter 150 is constituted by two cascaded stages power converter stage 151 and power converter stage 152. The power converter stage 151 includes a 1:1 unregulated DCX stage operated under resonance condition and soft-switching. The power converter stage 151 provides the required isolation and, since the transformer 421 turn ratio is equal to 1, the secondary winding 422 supplies the second power converter stage 152 with a voltage equal to the supply voltage VBAT stored as intermediate voltage VINT in capacitor C3. Via the transformer 420 and corresponding isolation, the intermediate voltage VINT is not referenced to the same ground reference at node 411. In other words, intermediate voltage VINT has its own isolated ground reference at node 412.

In one embodiment, the resonant inductor Lres of the power converter stage 151 is assumed to be the leakage inductance of transformer 420. The controller 140 controls the switching frequency of the power converter stage 151 and corresponding switches to be near or the same as the resonant switching frequency associated with the series resonant circuit including capacitor Cres, inductor Lres, and primary winding 421.

In one embodiment, the power converter stage 152 receiving the generated intermediate voltage VINT is a two phase interleaved regulated buck converter which outputs the auxiliary voltage VAUX. The buck converters in the power converter stage 152 can be operated in any suitable mode such as CCM (Continuous Conduction Mode), DCM (Discontinuous Conduction Mode) or BCM/TCM (Boundary/Triangular Current Mode) for soft-switching capabilities. As discussed before the load voltage will be given by the sum of the battery voltage and the auxiliary voltage:

V_load=BAT+VAUX
with 25V≤VBAT≤41 VDC
considering V_load=48V:
7 VDC≤VAUX≤23 VDC

In one embodiment, switches are rated according to the supply voltage VBAT, therefore, 60V rated devices are sufficient instead of 80V devices as in the SotA boost solution where all the switches should have been rated at 80V. Considering a total load 118 demanded power of potentially 3 kW and a supply voltage VBAT ranging from 25 VDC to 41 VDC, the maximum power processed by the converter (i.e., when the supply voltage VBAT is at its minimum, 25 VDC) is 1440 W (watts), which is less than half of total power. This together with the possibility of employing switch devices with better FOMs (due to the less stringent voltage requirements) helps to improve the overall system conversion efficiency of the bidirectional power converter 150.

Figure 5:
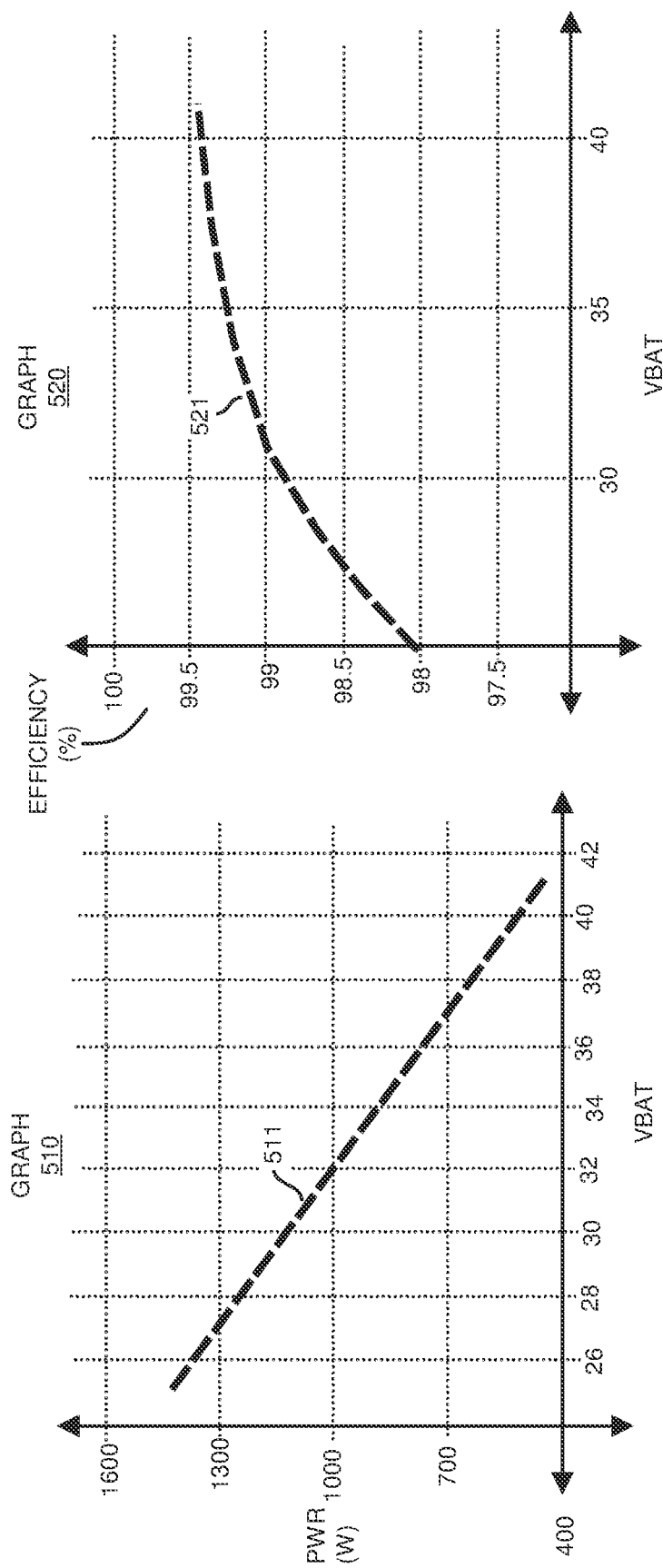
FIG. 5A is an example diagram illustrating power versus battery voltage according to embodiments herein.
FIG. 5B is an example diagram illustrating conversion efficiency versus battery voltage according to embodiments herein.

FIG. 5A is an example diagram illustrating power converter processed power versus supply voltage (such as from energy storage resource) according to embodiments herein.

As shown in graph 510, the power processed by the bidirectional power converter 150 and a first estimation of the overall system conversion efficiency (such as function 511) versus the supply voltage VBAT, for a so-called 10S8P stack where the magnitude of the voltage VBAT varies between 25 VDC and 42 VDC, are plotted in FIG. 5A. The graph 510 confirms what was previously discussed. That is, because the energy storage resource 120 itself provides most of the power associated with the backup voltage 221, less power is processed by the bidirectional power converter 150 to produce the voltage VAUX. This results in higher overall power converter overall efficiency.

By looking at the range of input voltage 25V≤VBAT≤41V and to the output voltage V_load=48 VDC, it is shown that the whole system is actually providing boosting capabilities. Partial power conversion such as voltage stepping-up is achieved through the second power converter stage 152 (such as a buck converter or other suitable topology) whose transfer function, in one embodiment, doesn't show any right half plane zero enabling, therefore, higher controller bandwidth and making the overall system response faster with respect to a boost converter.

FIG. 5B is an example diagram illustrating conversion efficiency versus battery voltage according to embodiments herein.

In this example embodiment, the function 521 in graph 520 is a plot of efficiency associated with the bidirectional power converter 150 converting the supply voltage VBAT into the backup voltage 221. The efficiency is very high because most power is supplied by the energy storage resource 120 without being converted via the bidirectional power converter 150. In other words, as previously discussed, the backup voltage 221 is primarily produced from the supply voltage VBAT.

FIG. 6 is an example timing diagram illustrating operation of a first power converter stage in a bidirectional power converter according to embodiments herein.

In one embodiment, the settings associated with the bidirectional power converter 150 in FIG. 4 are as follows:
VBAT=41V to 25V
C3=90 μF
C1=10 μF
C_res=400 nF
L_res=100 nH (transformer's leakage inductance)
L_mag=2 μH
L1=L2=20 μH
P_load=3 kW
backup voltage 221=V_load=48 VDC
f_(sw, DCX, power converter stage 151)=750 kHz
f_(sw, Buck, power converter stage 152)=200 kHz
transformer 420; n_1: n_2=1

As previously discussed, in mode #2, the controller 140 produces control signals such that the backup voltage 221 is a summation of the supply voltage VBAT (such as 41V/25V) and the auxiliary voltage VAUX generated backup the second power converter stage 152.

Graph 610 in FIG. 6 illustrates generation of control signals 105 (such as S1 and S2) and corresponding current ILRES through the inductor LRES to convert the supply voltage VBAT into the intermediate voltage VINT. Such a plot confirms that the switches Q1-Q8 need only be rated to withstand the magnitude of the supply voltage VBAT. In one embodiment, the voltage rating of switches Q5-Q8 depends also on the transformer 420 turn-ratio (of the primary winding 421 to the secondary winding 422) when it is different from 1. As previously discussed, the flow of current ILRES through the primary winding 421 of the transformer 420 produces a respective voltage on the secondary winding 422 that is rectified into the intermediate voltage VINT via switches Q5-Q8.

FIG. 7 is an example timing diagram illustrating operation of a second power converter stage in a bidirectional power converter according to embodiments herein.

In this example embodiment, as shown in graph 710, the controller 140 produces control signals 106 such as including S9 and S10 to control respective high side switch circuitry Q9 and low side switch circuitry Q10 in the power converter stage 152. As previously discussed, the controller 140 produces the controls signals 106 (S9 and S10) such that the combination of the auxiliary voltage VAUX plus the voltage VBAT is very close to the target backup voltage 221 of 48 VDC.

More specifically, as previously discussed, the activation of the high side switch circuitry Q9 and deactivation of low side switch circuitry Q10 between times T71 and T72, T73 and T74, T75 and T76, etc., causes the current IL1 through the inductor L1 to increase (ramp up) as shown. The deactivation of the high side switch circuitry Q9 and activation of low side switch circuitry Q10 between T72 and T73, T74 and T75, etc., causes the current IL1 through the inductor L1 to decrease (ramp down) as shown. Control of the switches Q9 and Q10 based on monitoring a magnitude of the voltage V116 at node 116 produces the auxiliary voltage VAUX to be a precise voltage value. For example, the controller 140 compares a magnitude of the backup voltage VBAT to a target setpoint voltage value of 48 VDC and produces the controls signals 106 such that the backup voltage 221 is precisely equal to the target setpoint voltage of 48 VDC.

Note that, in a similar manner as shown in graph 710, the controller 140 produces the control signals 106 (S11 and S12) to control operation of the switches Q11 and Q12. In one embodiment, the controller 140 produces the control signals S9 and S10 to be out of phase with respect to signals S11 and S12 to reduce ripple associated with the auxiliary voltage VAUX. The combination of IL1 and 112 produce the auxiliary voltage VAUX.

Note that the ON-time duration of the high side switch circuitry (such as switches Q9 and Q11) increases as the voltage VBAT from the energy storage resource 120 decreases. Thus, the rate of ramping up and down of the current IL1 and IL2 vary over time.

Figure 8:
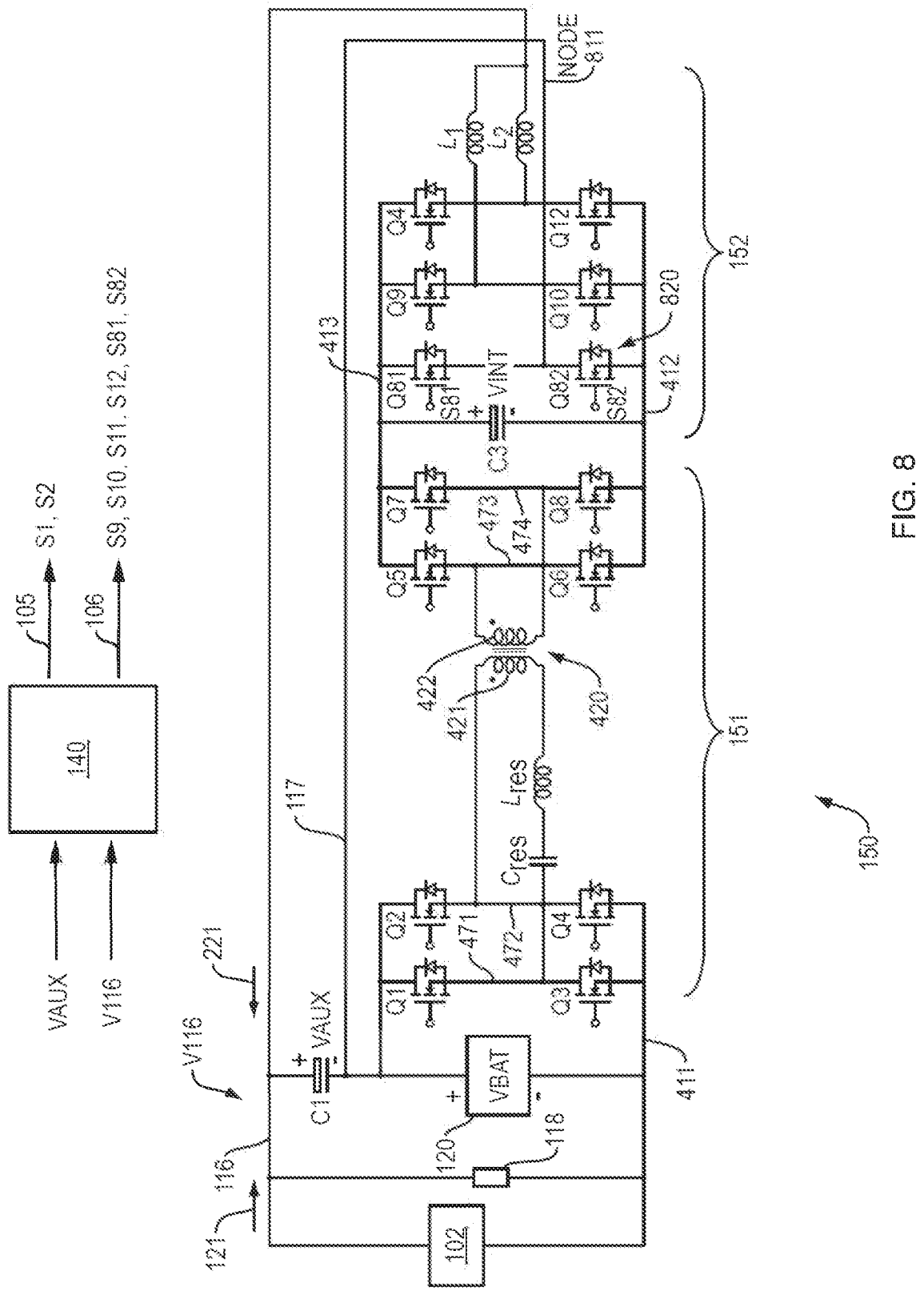
FIG. 8 is an example diagram illustrating a power supply circuit including a bidirectional power converter according to embodiments herein.

FIG. 8 is an example diagram illustrating a power supply circuit including a bidirectional power converter according to embodiments herein.

Another embodiment of the bidirectional power converter 150 is a variation of the circuit shown in FIG. 4 and suitable for battery pack configurations, like the 14S6P, where the battery voltage can be either higher or lower than the bus voltage (48V). However, the bidirectional power converter 150 in FIG. 8 includes stage 820. Stage 820 includes switch Q81 driven by signal S81 and switch Q82 driven by signal S82.

The combination of switch Q81 and Q82 are connected in series between the node 413 and 412. For example, the drain node of switch Q81 is connected to node 413; the source node of switch Q81 is connected to the drain node of switch Q82 at node 811; the source node of switch Q82 is connected to node 412. Signal S81 drives the gate node of switch Q81; signal S82 drives the gate node of switch Q82. Node 811 is connected to node 117.

In this case, the challenge is the fact that since the supply voltage VBAT ranges from a value higher than the target voltage 48 VDC to a value lower than the target voltage 48 VDC, it is necessary to dynamically vary the polarity of the auxiliary voltage VAUX such that VAUX is negative when VBAT>48 VDC and VAUX is positive when VBAT<48 VDC.

To this end, the bidirectional power converter 150 in FIG. 8 includes a totem-pole stage 820 between the capacitor C3 and the power converter stage 152. When VBAT>48 VDC, the controller 140 activates (via signal S81) the high side switch circuitry (switch Q81) to an ON state and deactivates (via signal S82) switch Q82 to an OFF state to connect the positive pole of the capacitor C3 (and intermediate voltage VINT) with the negative pole of the capacitor C1 and providing, therefore, in combination with the power converter stage 152 (buck stage operation), the required VAUX=48 VDC-VBAT.

When VBAT<48 VDC, the controller 140 deactivates the high side switch circuitry (switch Q81) to an OFF state and activates switch Q82 to an ON state to connect the negative pole of the capacitor C3 to the negative pole of the capacitor C1 and providing, therefore, in combination with the power converter stage 152 (buck stage operation), the required VAUX=48 VDC-VBAT.

In one embodiment, the transformer 420 has a turn ratio of 2:1 (primary winding to secondary winding) so that the capacitor C3 is charged at VINT=VBAT/2.

According to such turn ratio, only the DCX primary side switches Q1-Q4 need to be rated at 80V (due to V_(batt, max)=57V) while all the others can be rated at 40V.

In this example embodiment, the totem-pole stage (such as series combination of switches Q81 and Q82 between the node 413 and node 412 enables switching of the polarity of the auxiliary voltage VAUX during conditions in which the magnitude of the supply voltage VBAT is greater than the target voltage 48 VDC associated with generation of the backup voltage 221. As previously discussed, the backup voltage 221 is equal to the supply voltage VBAT from energy storage resource 120 and generated auxiliary voltage VAUX.

Figure 9:
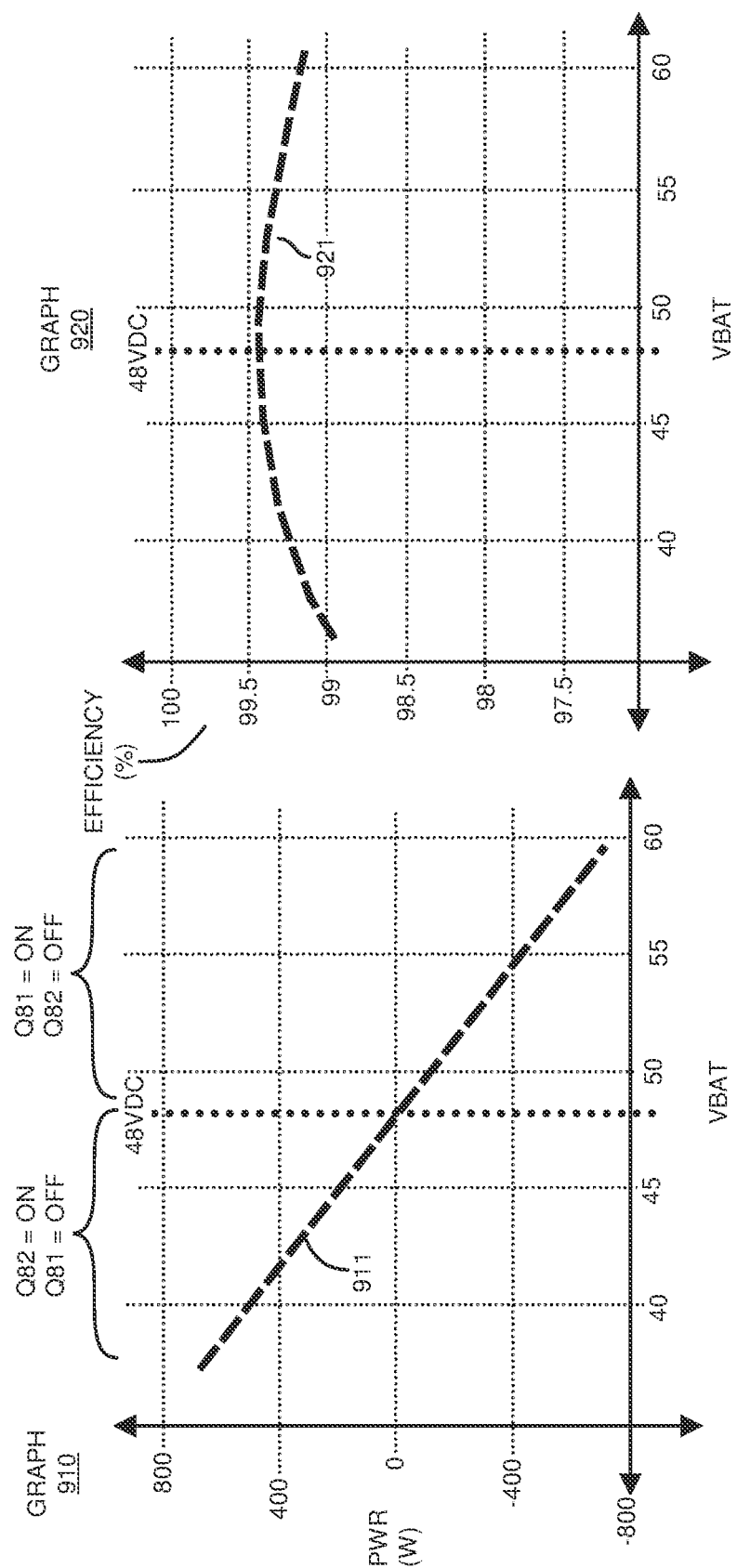
FIG. 9A is an example diagram illustrating power versus battery voltage according to embodiments herein.
FIG. 9B is an example diagram illustrating power conversion efficiency versus battery voltage according to embodiments herein.

Thus, according to the 14S6P voltage range 35-57 VDC, the power processed by the bidirectional power converter 150 and an estimation of the conversion efficiency associated with the bidirectional power converter 150 is plotted via function 921 in graph 920 of FIG. 9B.

Due to the higher battery voltage VBAT (associated with energy storage resource 120) compared to the 10S8P pack, and according to the following formula: P_conv=P_load*ABS(1-V_batt/V_load), the power processed in this case is significantly lower with respect to the 10S8P case, leading to an extremely high overall system efficiency which is always above 99% over the whole input battery voltage range.

The circuit was simulated according to the following parameters:
  V_(batt) linearly decreasing from 57V to 35V
  C_mid=100 µF
  C_aux=50 µF
  C_res=400 nF
  L_res=100 nH (transformer's leakage inductance)
  L_mag=2 µH
  L_buck=2×5 pH
  P_load=3 kW
  V_load=48V
  f_(sw, DCX)=750 kHz
  f_(sw, Buck)=200 kHz
  n_1: n_2=2

As previously discussed, the above settings vary depending on the embodiment.

Via operation of the bidirectional power converter 150 in FIG. 8, the auxiliary voltage VAUX is correctly regulated during the whole discharging phase of the battery whose voltage varies from 57V to 35V (See also FIGS. 9A and 9B below for operational range and operating parameters). It is also noted that for VBAT>48 VDC, the buck output voltage, is negative (HS switch Q81 of the totem-pole conducting), while for V_batt<48V it is positive (LS switch Q82 of the totem-pole conducting).

In one embodiment, the voltage overshoot during the high side switch circuitry activation of switch Q81 to low side switch circuitry activation of switch Q82 in the totem-pole switch transition is very smooth and the voltage deviation of the bus is restrained to 66 mV. Such transition, managed by the controller 140, is triggered when two condition are verified at the same time: i) the first condition is that the supply voltage VBAT is within a narrow range around 48V, ii) the second condition is that the duty cycles of the two buck phases is saturated to 1, meaning that the input voltage is at a (48+E) V and that since the next cycle of the buck in power converter stage 152 must provide a positive voltage instead of a negative one. In one embodiment, note that the totem-pole transition as described herein takes place when voltage VBAT is within a narrow range around Vbackup.

Note that, in one embodiment, the smooth transition with only a 66 mV overshoot is enabled by the fact that the current flowing in the buck inductors L1 and L2, is positive during the whole battery input voltage VBAT range and doesn't need to change polarity which would slow down the system response as it would take a finite amount of time to change the current direction leading to a considerable total output voltage variation during the negative to positive buck auxiliary output voltage transition. Such feature is enabled by the control strategy employed as described before.

FIG. 9A is an example diagram illustrating power versus battery voltage according to embodiments herein.

Via function 911, graph 910 illustrates that the polarity of the intermediate voltage VINT must be switched depending on a magnitude of the supply voltage VBAT. For example, during operation in mode #2 of generating the backup voltage 221, as previously discussed, the controller activates switch Q81 (FIG. 8) to an ON state and deactivates switch Q82 (FIG. 8) to an OFF state when the magnitude of the supply voltage VBAT is greater than the target voltage of 48 VDC; the controller deactivates switch Q81 to an OFF state and activates switch Q82 to an ON state when the magnitude of the supply voltage VBAT is less than the target voltage of 48 VDC. This ensures that the polarity of the auxiliary voltage VAUX is correct when generating the backup voltage 221 to be 48 VDC across the range of magnitudes between 35 and 60 VDC.

FIG. 9B is an example diagram illustrating power conversion efficiency versus battery voltage according to embodiments herein.

In this example embodiment, the function 921 in graph 920 is a plot of efficiency of the bidirectional power converter 150 converting the supply voltage VBAT into the backup voltage 221. The efficiency is very high because most power is supplied by the energy storage resource 120 without being converted. In other words, as previously discussed, the backup voltage 221 is primarily produced from the supply voltage VBAT.

Further, as previously discussed, embodiments herein include, via the bidirectional power converter 150, offsetting the auxiliary voltage VAUX (an isolated regulated voltage) with respect to the supply voltage VBAT outputted from the energy storage resource 120 to produce the backup voltage 221. In one embodiment, as shown in graph 920, an efficiency of producing the backup voltage 221 via the bidirectional power converter 150 (starting at maximum voltage of VBAT=60 VDC) increases over time subsequent to initial activation of the bidirectional power converter 150 to operate in the second mode.

More specifically, the supply voltage VBAT may initially be 60 VDC after being fully charged. When switched over from the first mode to the second mode, the bidirectional power converter 150 converts the energy in the energy storage resource 120 into the backup voltage 221. This causes the magnitude of the supply voltage VBAT to decrease from 60 VDC towards 40 VDC. Power converter efficiency of the bidirectional power converter 150 increases between the starting point 60 VDC and the supply voltage VBAT equal to the target voltage 48 VDC, in which the lower VBAT voltage occurs due to discharge of the energy storage resource 120 over time.

Figure 10:
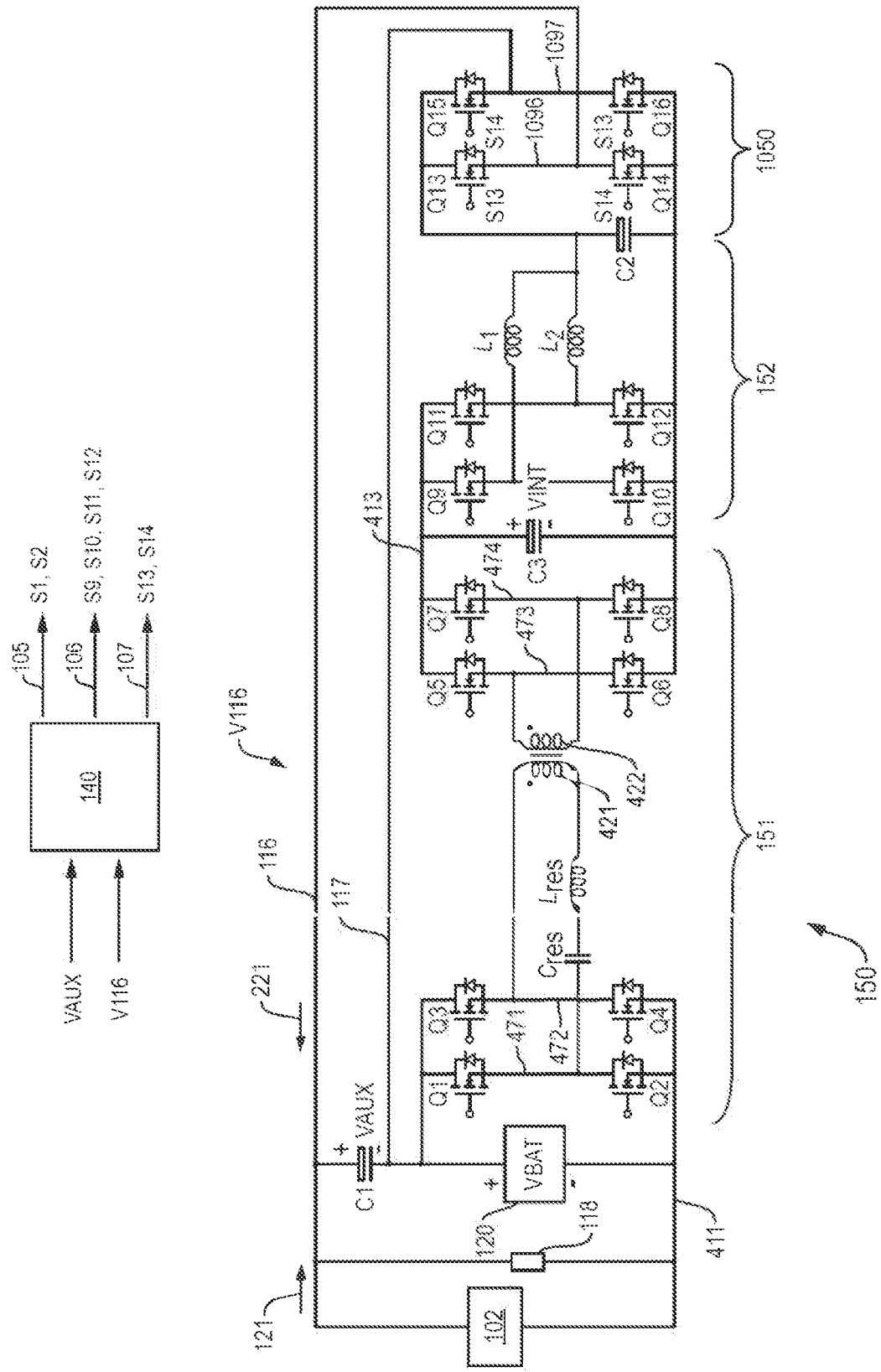
FIG. 10 is an example diagram illustrating a power supply circuit including a bidirectional power converter according to embodiments herein.

FIG. 10 is an example diagram illustrating a power supply circuit including a bidirectional power converter according to embodiments herein.

In this example embodiment, the bidirectional power converter 150 includes the components as previously discussed in FIG. 4 as well as includes stage 1050 such as a so-called full-bridge unfolder stage, which includes switches Q13, Q14, Q15, and Q16.

As further shown, switch Q13 and switch Q14 are connected in series between the node 1013 and node 412. More specifically, the drain node of switch Q13 is connected to the node 1013; the source node of switch Q13 is connected to the drain node of switch Q14 at node 1096; the source node of switch Q14 is connected to the node 412.

Switch Q15 and switch Q16 are connected in series between the node 1013 and node 412. More specifically, the drain node of switch Q15 is connected to the node 1013; the source node of switch Q15 is connected to the drain node of switch Q16 at node 1076; the source node of switch Q16 is connected to the node 412.

As previously discussed, the controller 140 produces signals 107 such as signals S13 and S14. Control signal S13 is inputted to the gate of switch Q13; control signal S13 is inputted to the gate of switch Q16. Control signal S14 is inputted to the gate of switch Q14; control signal S14 is inputted to the gate of switch Q15.

In this example embodiment, the supply voltage VBAT from the energy storage resource 120 (such as 14S6P, where supply voltage VBAT varies between 35 VDC and 57 VDC). The supply voltage VBAT supplied by the energy storage resource 120 can be either higher or lower than the bus voltage (48V) depending on a state of charge associated with the energy storage resource 120. The power converter stage 151 and the power converter stage 152 are unchanged with respect to the previous embodiments, while the stage 1050 provides a negative or positive auxiliary voltage VAUX depending on states of respective switches Q13-Q16.

Specifically, when supply voltage VBAT>48 VDC and a negative auxiliary voltage VAUX is needed to produce the backup voltage 221, via control signal S13 and S14, the controller 140 activates switch Q15 and switch Q14 to an ON state; the controller 140 deactivates switches Q13 and Q16 to an OFF state.

When supply voltage VBAT<48 VDC and a positive auxiliary voltage VAUX is needed to produce the backup voltage 221, via control signals S13 and S14, the controller 140 activates switch Q13 and switch Q16; the controller 140 deactivates switches Q14 and Q15 to an OFF state.

In a similar manner as previously discussed, the controller 140 controls operation of the power converter stage 151 and power converter stage 152 to produce the backup voltage 221 to be around the target voltage of 48 VDC. More specifically, during the mode #2, the backup voltage 221 is given by the sum of the supply voltage VBAT plus the auxiliary voltage VAUX.

Figure 11:
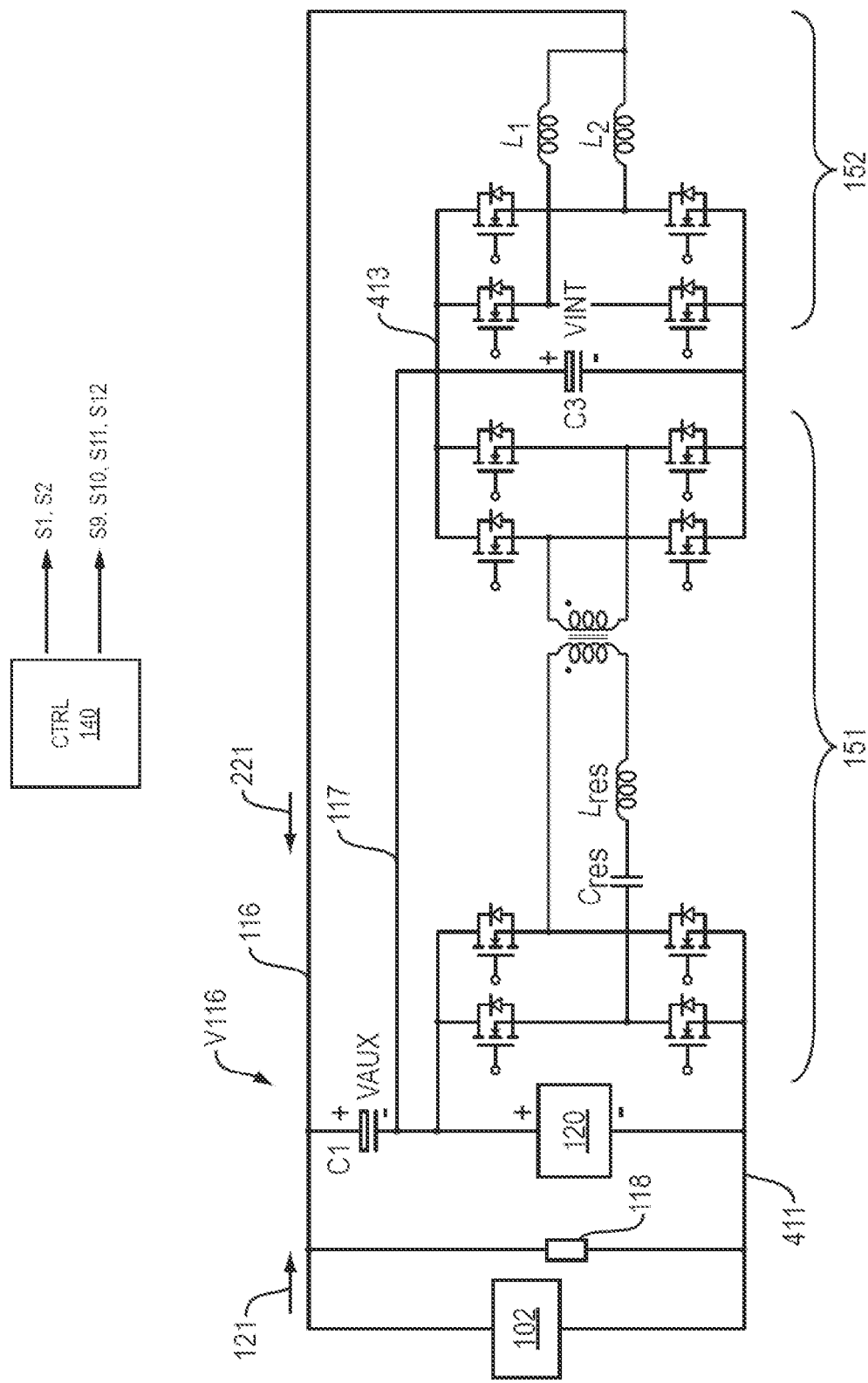
FIG. 11 is an example diagram illustrating a power supply circuit including a bidirectional power converter according to embodiments herein.

FIG. 11 is an example diagram illustrating a power supply circuit including a bidirectional power converter according to embodiments herein.

This example embodiment is similar to that shown in FIG. 4. However, the node 413 associated with the capacitor C3 is directly connected to the node 117 (negative pole) of the capacitor C1. This causes the auxiliary voltage VAUX generated by the power converter stage 152 to be referenced with respect to the supply voltage VBAT.

Thus, in order to cope with battery packs where the voltage is always higher than the dc-bus voltage (48 VDC), like the 20S4P configuration, the embodiment of the bidirectional power converter 150 depicted in FIG. 11 is proposed. Since supply voltage VBAT is always >48 VDC in this example embodiment, the power converter stage 152 needs to generate a negative auxiliary voltage VUX, which is achieved by referencing the auxiliary capacitor C1 (negative voltage node such as node 117) to the positive voltage of the capacitor C3 such as node 413). In other words, a first node of the capacitor C1 is directly connected to the node 116; the second node of the capacitor C1 is directly connected to the node 413. The transformer 420 turn ratio is chosen to be 1, however, having it equal to 2 enables the possibility to employ for the power converter stage 151 (such as DCX) and the power converter stage 152 (such as buck stages) 60V rated transistor devices rather than 150 VDC as the DCX primary side switches whose rating is according to V_(batt, max)=85V.

In a similar manner as previously discussed, the backup voltage 221 is given by the sum of the supply voltage VBAT (such as battery voltage) and the auxiliary output voltage VAUX of the power converter stage 152.

In one non-limiting example embodiment, the settings for bidirectional power converter 150 are follows:
 range VBAT=85V and VBAT=53V
 C3=90 µF
 C1=10 µF
 C_res=400 nF L_res=100 nH (transformer's leakage inductance)
L_mag=2 µH
L1=L2=20 µH
P_load=3 kW
V116=48 VDC
f_(sw, DCX, power converter stage 151)=750 kHz
f_(sw, Buck, power converter stage 152)=200 kHz
transformer 420 n_1: n_2=2

The above settings vary depending on the embodiment.

In one embodiment, according to the highest and the lowest supply voltage VBAT such as 85 VDC to 53 VDC. During operation of the bidirectional power converter 150 in FIG. 11, the backup voltage 221 such as 48 VDC is obtained as summation of the supply voltage VBAT of 85 VDC to 53 VDC and the auxiliary voltage VAUX such as −37 VDC to −5 VDC. Thus, as shown in FIG. 11, one end of the capacitor C1 can be directly coupled to the node 413 to support generation of the backup voltage 221 using a negative auxiliary voltage VAUX.

Figure 12:
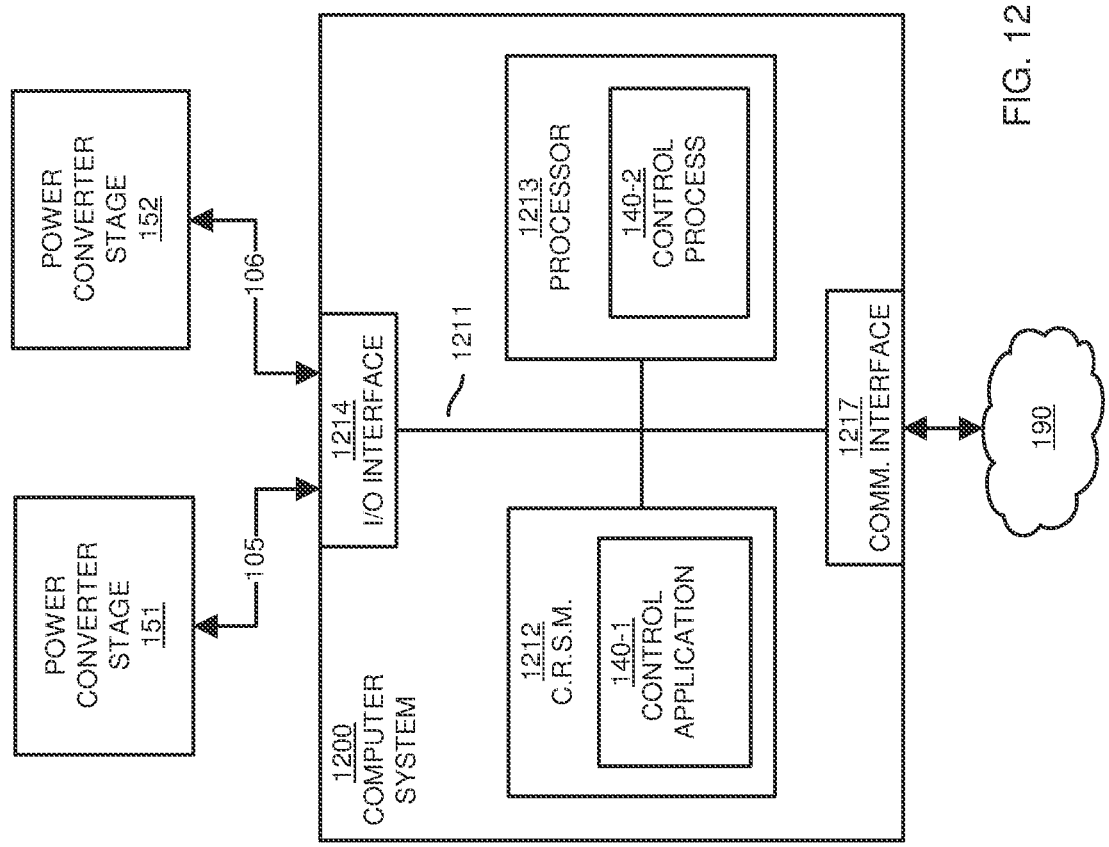
FIG. 12 is an example diagram illustrating computer processor hardware and related software instructions that execute methods according to embodiments herein.

FIG. 12 is an example block diagram of a computer device for implementing any of the operations as discussed herein according to embodiments herein.

As shown, computer system 1200 (such as implemented by any of one or more resources such as controller 140, bidirectional power converter 50, etc.) of the present example includes an interconnect 1211 that couples computer readable storage media 1212 such as a non-transitory type of media (or hardware storage media) in which digital information can be stored and retrieved, a processor 1213 (e.g., computer processor hardware such as one or more processor devices), I/O interface 1214 (e.g., to output control signals to the power converter phases, monitor current, etc.), and a communications interface 1217.

I/O interface 1214 provides connectivity to any suitable circuitry such as power supply 100 and corresponding power converter phases 111, 112, etc.

Computer readable storage medium 1212 can be any hardware storage resource or device such as memory, optical storage, hard drive, floppy disk, etc. In one embodiment, the computer readable storage medium 1212 stores instructions and/or data used by the controller application 140-1 to perform any of the operations as described herein.

Further in this example embodiment, communications interface 1217 enables the computer system 1200 and processor 1213 to communicate over a resource such as network 190 to retrieve information from remote sources and communicate with other computers.

As shown, computer readable storage media 1212 (such as computer-readable storage hardware) is encoded with controller application 140-1 (e.g., software, firmware, etc.) executed by processor 1213. Controller application 140-1 can be configured to include instructions to implement any of the operations as discussed herein.

During operation of one embodiment, processor 1213 accesses computer readable storage media 1212 via the use of interconnect 1211 in order to launch, run, execute, interpret or otherwise perform the instructions in controller application 140-1 stored on computer readable storage medium 1212.

Execution of the controller application 140-1 produces processing functionality such as controller process 140-2 in processor 1213. In other words, the controller process 140-2 associated with processor 1213 represents one or more aspects of executing controller application 140-1 within or upon the processor 1213 in the computer system 1200.

In accordance with different embodiments, note that computer system 1200 can be a micro-controller device, logic, hardware processor, hybrid analog/digital circuitry, etc., configured to control a power supply and perform any of the operations as described herein.

Functionality supported by the different resources will now be discussed via flowchart in FIG. 13. Note that the steps in the flowcharts below can be executed in any suitable order.

Figure 13:
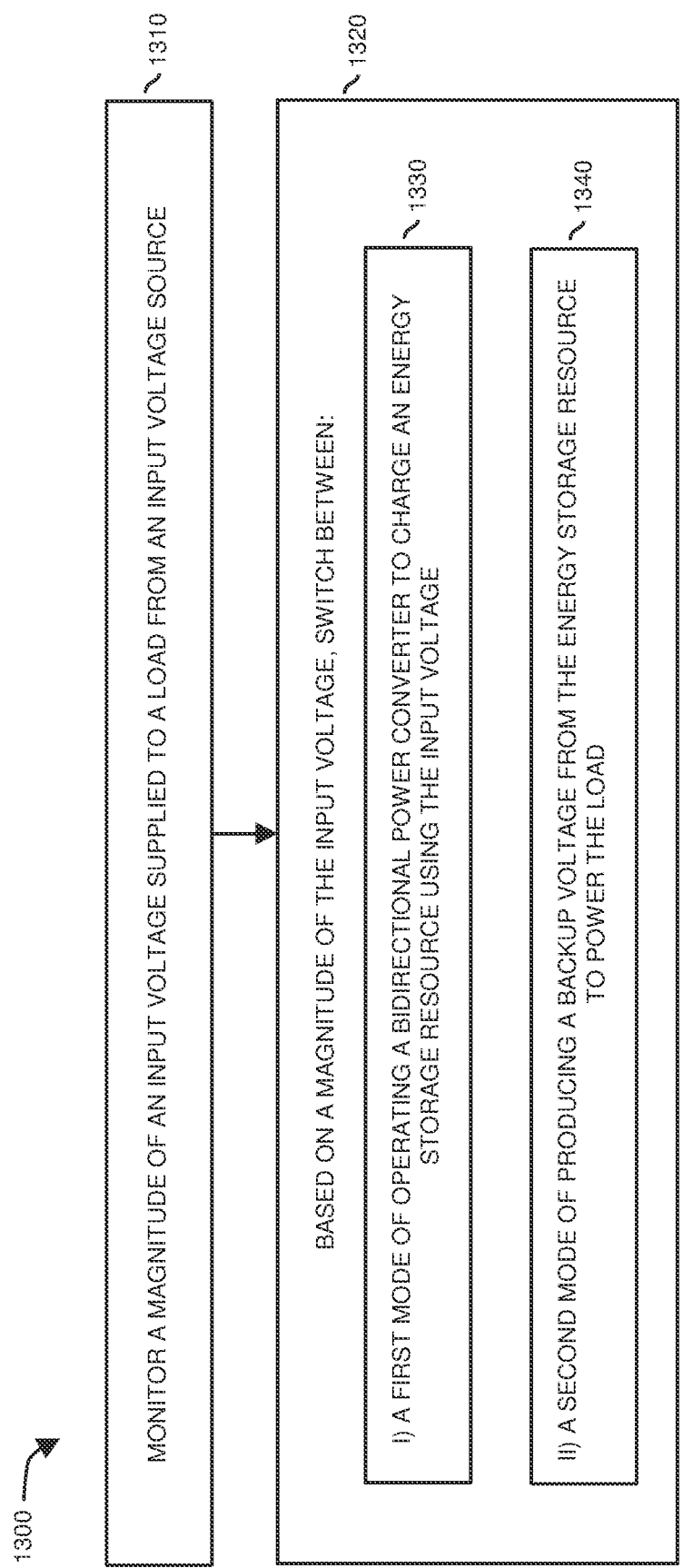
FIG. 13 is an example diagram illustrating a method according to embodiments herein.

FIG. 13 is an example diagram illustrating a method of controlling a power converter according to embodiments herein.

In processing operation 1310, the controller 140 monitors a magnitude of an input voltage 121 supplied to a load 118 from an input voltage source 102.

In processing operation 1320, based on a magnitude of the input voltage 121, the controller 140 switches between: i) a first mode (processing operation 1330) of operating the bidirectional power converter 150 to charge the energy storage resource 120 using the input voltage 121, and ii) a second mode (processing operation 1340) of producing a backup voltage 221 from the energy storage resource 120 to power the load 118.

Figure 14:
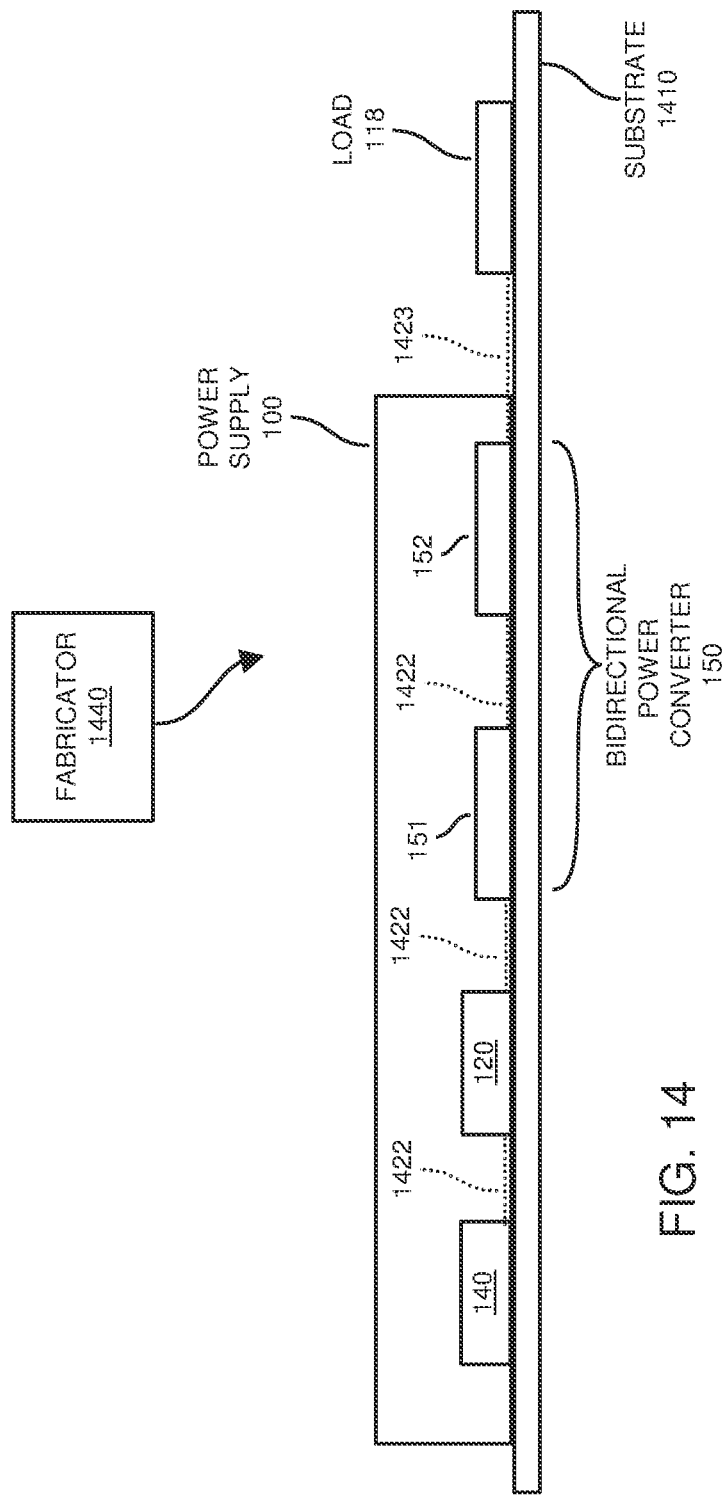
FIG. 14 is an example diagram illustrating assembly of a circuit according to embodiments herein.

FIG. 14 is an example diagram illustrating assembly of a power supply and multiple interconnected power converter phases on a circuit board according to embodiments herein.

In this example embodiment, assembler 1440 receives a substrate 1410 and corresponding components of power supply 100 to fabricate controller 140, energy storage resource 120, power bidirectional power converter 150 including the power converter stage 151 and power converter stage 152, etc. The assembler 1440 affixes (couples) the controller 140 and other components such as associated with the power supply 100 to the substrate 1410.

Via respective circuit paths 1422 as described herein, the assembler 1440 provides connectivity between the controller 140, energy storage resource 120, power converter stage 151, power converter stage 152, etc.

Note that components such as the controller 140, bidirectional power converter 150, energy storage resource 120, and corresponding components can be affixed or coupled to the substrate 1410 in any suitable manner. For example, each of the one or more of the components in power supply 100 can be soldered to the substrate 1410, inserted into respective sockets disposed on the substrate 1410, etc.

Note further that the substrate 1410 is optional. Any of one or more circuit paths or connectivity as shown in the drawings and as described herein can be disposed in cables or other suitable medium.

In one nonlimiting example embodiment, the load 118 is disposed on its own substrate independent of substrate 1410; the substrate of the load 118 (such as substrate 1410 or other substrate) is directly or indirectly connected to the substrate 1410 via connectivity 1423 such as one or more of wires, cables, links, etc. The controller 140 or any portion of the power supply 100 and corresponding power converter stages 151 and 152 can be disposed on a standalone smaller board plugged into a socket of the substrate 1410 as well.

Via one or more circuit paths 1423 (such as one or more traces, cables, connectors, wires, conductors, electrically conductive paths, etc.), the assembler 1440 couples the power supply 100 and corresponding components to the load 118. In one embodiment, the circuit path 1423 conveys the backup voltage 221 and corresponding current to the load 118.

Accordingly, embodiments herein include a system comprising: a substrate 1410 (such as a circuit board, standalone board, mother board, standalone board destined to be coupled to a mother board, host, etc.); a power supply system 100 including corresponding components as described herein; and a load 118 (such as a motor, winding, etc.).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1110 or disposed at a remote location.

Note again that techniques herein are well suited for use in circuit applications such as those that that generate an output voltage to power a load. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a bidirectional power converter;
   an energy storage resource;
   a capacitor; and
   a controller operative to:
   i) monitor a magnitude of an input voltage supplied to a load from an input voltage source, and
   ii) based on a magnitude of the input voltage, switch between a first mode of operating the bidirectional power converter to charge the energy storage resource using the input voltage and a second mode of operating the bidirectional power converter to produce a backup voltage from the energy storage resource to power the load;
   the apparatus further comprising:
   a first circuit path including the capacitor disposed in series with the energy storage resource between a first node and a second node, a third node of the first circuit path directly coupling the capacitor to the energy storage resource, wherein the first node of the capacitor is operative to receive the input voltage while the bidirectional power converter is operated in the first mode;
   wherein the bidirectional power converter, while in the first mode, is operative to convert the input voltage received from the first node into a charging voltage supplied to the third node to charge the energy storage resource;
   wherein the bidirectional power converter, while in the second mode, is operative to: i) from the third node, receive a supply voltage from the energy storage resource; ii) convert the supply voltage into the backup voltage; and
   iii) output the backup voltage to the first node; and
      wherein the first circuit path is disposed in parallel with the load in which: i) a first terminal of the load is directly coupled to the first node, and ii) a second terminal of the load is directly coupled to the second node.

2. The apparatus as in claim 1, wherein the energy storage resource is disposed in series with the bidirectional power converter to produce the backup voltage during the second mode; and
   wherein a magnitude of the backup voltage in the second mode is equal to an auxiliary voltage generated by the bidirectional power converter plus the supply voltage supplied by the energy storage resource.

3. The apparatus as in claim 1, wherein a magnitude of power conveyed from the input voltage to charge the energy storage resource while in the first mode is less than a magnitude of power supplied by the energy storage resource to produce the backup voltage in the second mode.

4. The apparatus as in claim 1, wherein the energy storage resource is operative to output the supply voltage to the bidirectional power converter in the second mode, a magnitude of the supply voltage varying in a particular voltage range; and
   wherein a magnitude of the backup voltage falls within the particular voltage range during operation of the bidirectional power converter in the second mode.

5. The apparatus as in claim 1, wherein the bidirectional power converter is operative to, during the second mode:
   i) convert the supply voltage received from the energy storage resource into an auxiliary voltage; and
   ii) produce the backup voltage to power the load using the auxiliary voltage.

6. The apparatus as in claim 5, wherein a polarity of the auxiliary voltage depends on a magnitude of the supply voltage.

7. The apparatus as in claim 1, wherein the input voltage is a DC voltage; and
wherein the backup voltage is a DC voltage.

8. The apparatus as in claim 1, wherein an efficiency of the bidirectional power converter producing the backup voltage during the second mode increases over time subsequent to initial activation of the bidirectional power converter in the second mode.

9. The apparatus as in claim 1, wherein the bidirectional power converter includes a first terminal;
wherein the first terminal of the bidirectional power converter is operative to receive the input voltage during the first mode; and
wherein the first terminal of the bidirectional power converter is operative to output the backup voltage from the bidirectional power converter to the load during the second mode.

10. The apparatus as in claim 1, wherein the bidirectional power converter includes a first terminal and a second terminal;
wherein the first terminal is operative to receive the input voltage during the first mode; and
wherein the bidirectional power converter is operative to output the backup voltage from the bidirectional power converter through the first terminal to the load during the second mode.

11. The apparatus as in claim 10, wherein the bidirectional power converter, in the first mode, is operative to:
convert the input voltage received at the first terminal of the bidirectional power converter into the charging voltage; and
output the charging voltage from the second terminal of the bidirectional power converter to the energy storage resource, the charging voltage operative to charge the energy storage resource.

12. The apparatus as in claim 11, wherein the bidirectional power converter, in the second mode, is operative to:
receive the supply voltage from the energy storage resource through the second terminal;
convert the received supply voltage into the backup voltage; and
output the backup voltage from the first terminal to the load.

13. The apparatus as in claim 12, wherein the load and the energy storage resource are connected to a common ground reference associated with the input voltage source; and
wherein a magnitude of the backup voltage outputted from the second terminal to the load during the second mode is a summation of a magnitude of the supply voltage plus a magnitude of an auxiliary voltage generated by the bidirectional power converter.

* * * * *